(12) United States Patent
Mousseau et al.

(10) Patent No.: US 8,832,710 B2
(45) Date of Patent: *Sep. 9, 2014

(54) OPERATION CONTROL FOR DEPLOYING AND MANAGING SOFTWARE SERVICE IN A VIRTUAL ENVIRONMENT

(71) Applicant: Oracle International Corporation, Redwood Shores, CA (US)

(72) Inventors: Richard P. Mousseau, Stratham, NH (US); John Herendeen, Upton, MA (US); Mark Spotswood, Newton, MA (US); Ravi Sankar Akella, Fremont, CA (US); Codanda Chinnappa, Marblehead, MA (US); Michael Jasnowski, Amherst, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/102,137

(22) Filed: Dec. 10, 2013

(65) Prior Publication Data

US 2014/0101665 A1    Apr. 10, 2014

Related U.S. Application Data

(63) Continuation of application No. 12/618,474, filed on Nov. 13, 2009, now Pat. No. 8,627,328.

(60) Provisional application No. 61/114,742, filed on Nov. 14, 2008.

(51) Int. Cl.
*G06F 9/46* (2006.01)
*G06F 9/50* (2006.01)

(52) U.S. Cl.
CPC ............... *G06F 9/50* (2013.01); *G06F 9/5077* (2013.01)

USPC ................. 718/104; 718/1; 718/100; 706/47; 706/50; 709/202; 709/220; 709/223; 709/224; 709/226; 717/177

(58) Field of Classification Search
None
See application file for complete search history.

(56) References Cited

U.S. PATENT DOCUMENTS 8,046,765 B2 * 10/2011 Cherkasova et al. .......... 718/104
8,046,767 B2    10/2011 Rolia et al.
8,078,728 B1    12/2011 Pollan et al.

(Continued)

OTHER PUBLICATIONS

'Performance Isolation in Virtualized Machines' Dissertation by Rahul Gundecha, Department of Computer Science and Engineering, Indian Institute of Technology, Bombay, Jul. 4, 2008.*

(Continued)

*Primary Examiner* — Steven Snyder
(74) *Attorney, Agent, or Firm* — Meyer IP Law Group

(57) ABSTRACT

A system and method can deploy and manage software services in virtualized and non-virtualized environments. The system provides an enterprise application virtualization solution that allows for centralized governance and control over software and Java applications. Operations teams can define policies, based on application-level service level agreements (SLA) that govern the allocation of hardware and software resources to ensure that quality of service (QoS) goals are met across virtual and non-virtualized platforms. The system use a rules engine that can compare administrator defined constraints with runtime metrics; generate events when a constraint is violated by a metric of the runtime metrics and generate events when a constraint is violated by a metric of the runtime metrics.

18 Claims, 16 Drawing Sheets

(56) References Cited

U.S. PATENT DOCUMENTS

| | | | |
|---|---|---|---|
| 8,176,486 B2* | 5/2012 | Amir Husain | 718/1 |
| 8,301,746 B2* | 10/2012 | Head et al. | 709/223 |
| 8,307,362 B1 | 11/2012 | Gong et al. | |
| 8,370,833 B2 | 2/2013 | Bolles et al. | |
| 8,429,650 B2 | 4/2013 | Ferwerda et al. | |
| 8,434,088 B2* | 4/2013 | Banerjee et al. | 718/104 |
| 8,676,981 B2* | 3/2014 | Hackett et al. | 709/226 |
| 8,694,995 B2* | 4/2014 | Cawlfield et al. | 718/1 |
| 8,694,996 B2* | 4/2014 | Cawlfield et al. | 718/1 |
| 2005/0278441 A1* | 12/2005 | Bond et al. | 709/223 |
| 2006/0075079 A1* | 4/2006 | Powers et al. | 709/220 |
| 2006/0075407 A1* | 4/2006 | Powers et al. | 718/100 |
| 2006/0075408 A1* | 4/2006 | Powers et al. | 718/100 |
| 2006/0129687 A1* | 6/2006 | Goldszmidt et al. | 709/229 |
| 2007/0078988 A1* | 4/2007 | Miloushev et al. | 709/227 |
| 2007/0083648 A1* | 4/2007 | Addleman et al. | 709/224 |
| 2007/0233698 A1* | 10/2007 | Sundar et al. | 707/10 |
| 2008/0028409 A1* | 1/2008 | Cherkasova et al. | 718/104 |
| 2008/0104247 A1* | 5/2008 | Venkatakrishnan et al. | 709/226 |
| 2008/0201711 A1* | 8/2008 | Amir Husain | 718/1 |
| 2008/0215742 A1* | 9/2008 | Goldszmidt et al. | 709/229 |
| 2008/0271039 A1* | 10/2008 | Rolia et al. | 718/105 |
| 2008/0301175 A1* | 12/2008 | Applebaum et al. | 707/102 |
| 2009/0049443 A1* | 2/2009 | Powers et al. | 718/100 |
| 2009/0055522 A1* | 2/2009 | Shen et al. | 709/224 |
| 2010/0011104 A1* | 1/2010 | Crosbie | 709/226 |
| 2010/0125665 A1* | 5/2010 | Simpson et al. | 709/224 |
| 2010/0125844 A1* | 5/2010 | Mousseau et al. | 718/1 |
| 2011/0185063 A1* | 7/2011 | Head et al. | 709/226 |
| 2011/0258317 A1* | 10/2011 | Sinha et al. | 709/226 |
| 2012/0303805 A1* | 11/2012 | Simpson et al. | 709/224 |
| 2013/0326510 A1* | 12/2013 | Adekile et al. | 718/1 |

OTHER PUBLICATIONS

'Dynamic Placement of Virtual Machines for Managing SLA Violations' by Norman Bobroff et al., copyright 2007, IEEE.*

Definition of Scope, Dictionary.com, Nov. 3, 2008, 5 pages.

Olivieri, R., Implement Business Logic With the Drools Rules Engine, IBM, Mar. 18, 2008, 18 pages.

Gundecha, R., Performance Isolation in Virtualized Machines (Dissertation), Department of Computer Science and Engineering, Indian Institute of Technology, Bombay, India, Jul. 4, 2008, 98 pages.

Bobroff, N. et al., Dynamic Placement of Virtual Machines for Managing SLA Violations, copyright 2007, IEEE, 10 pages.

* cited by examiner

Figure 7

OPERATION CONTROL FOR DEPLOYING AND MANAGING SOFTWARE SERVICE IN A VIRTUAL ENVIRONMENT

CLAIM OF PRIORITY

This application is a continuation of U.S. patent application Ser. No. 12/618,474, titled "OPERATION CONTROL FOR DEPLOYING AND MANAGING SOFTWARE SERVICE IN A VIRTUAL ENVIRONMENT", filed Nov. 13, 2009, which is now U.S. Pat. No. 8,627,328, issued on Jan. 7, 2014 and which claims the benefit of priority to U.S. Provisional Patent Application No. 61/114,742, filed Nov. 14, 2008, titled "OPERATION CONTROL FOR DEPLOYING AND MANAGING SOFTWARE SERVICE IN A VIRTUAL ENVIRONMENT"; each of which above applications is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates generally to the management of application services in an enterprise environment, and, particularly, to a system and method for deploying and managing software services in virtualized and non-virtualized environments.

BACKGROUND

Organizations that utilize enterprise and application server software as part of their enterprise infrastructure are increasingly adopting virtualization technologies as part of their drive to increase utilization and reduce infrastructure costs, while at the same time improving their ability to respond rapidly to a new line of business initiatives.

Hypervisor-based virtualization platforms allow the organization to consolidate their information technology deployments onto a much reduced number of servers running powerful multi-core processors, which, in turn, host multiple virtual machines running applications in their own protected, virtualized environments. As a result, organizations have been able to optimize their physical infrastructure by pooling hardware and storage resources, reduce physical space, ease power and cooling costs, and improve application availability.

Recently, the focus has shifted to application virtualization—technologies that help information technology operations to package, deploy, monitor and control enterprise applications in these new virtual data centers to achieve flexible, dynamic operations that are more responsive, highly available and efficient. This is the area that embodiments of the present invention are designed to address.

SUMMARY

A system and method can deploy and manage software services in virtualized and non-virtualized environments. The enterprise application virtualization solution allows for centralized governance and control over software and Java applications. Operation teams can define policies, based on application-level service level agreements (SLA) that govern the allocation of hardware and software resources to ensure that quality of service (QoS) goals are met across virtual and non-virtualized platforms. In accordance with a embodiment, the system includes monitor service component to convert constraints specified by the users into a watch list, a rules engine to compare administrator defined constraints with runtime metrics, and an execution engine to obtain and execute a pipeline of actions of deploying and managing software services that are associated with a defined scope and encapsulates a behavior of a plurality of compute resources.

BRIEF DESCRIPTION OF THE FIGURES

FIG. 7 is an illustration that shows another screenshot of an Administrative Console interface that allows for setting of filters, in accordance with an embodiment.

DETAILED DESCRIPTION

Figure 1:
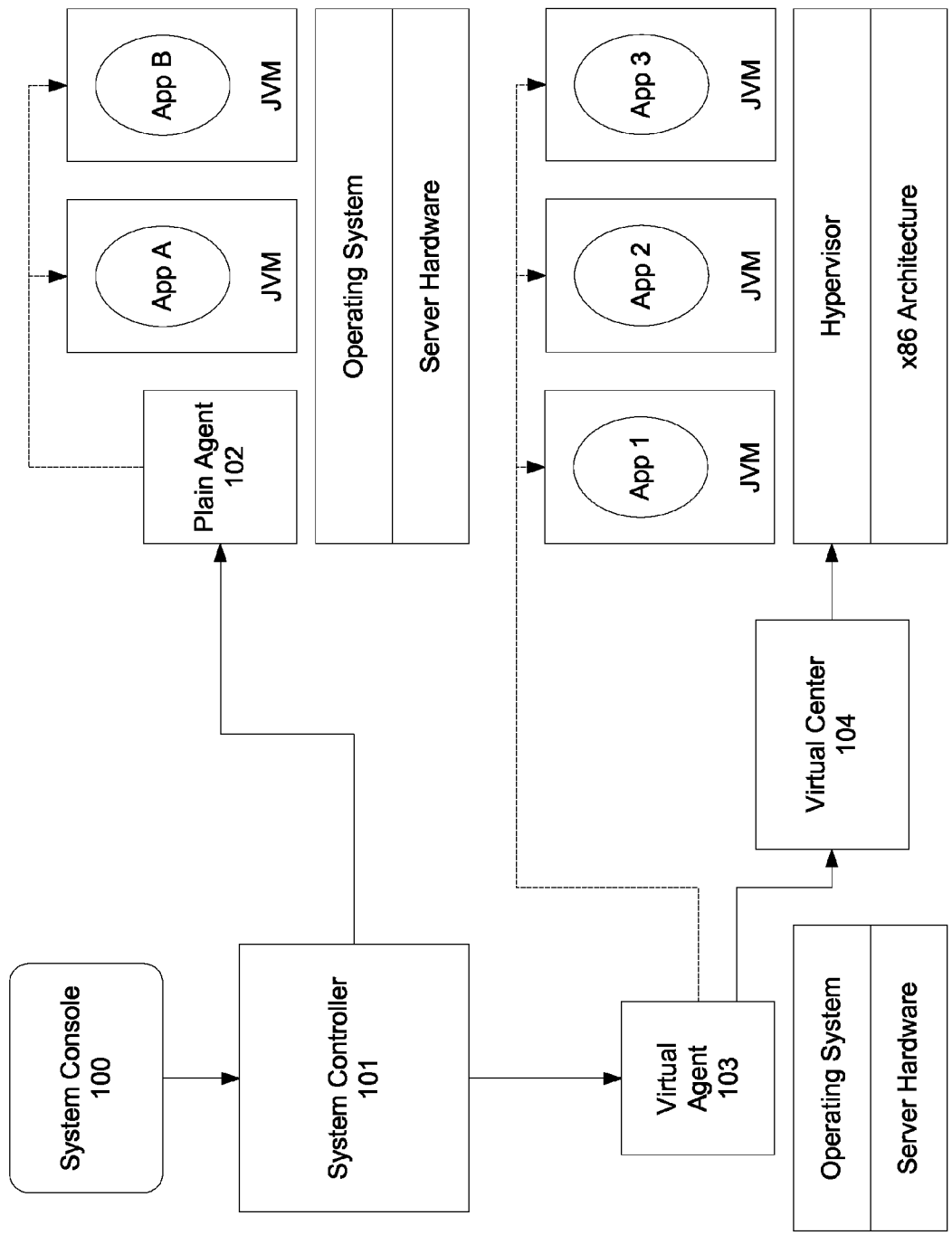
FIG. 1 is an illustration that shows the architecture of a system for deploying and managing software services, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses WebLogic® application server functions or libraries as an example for application server functions or libraries. It will be apparent to those skilled in the art that other types of application server functions or libraries can be used without limitation.

The description of the invention as following also uses Java® Virtual Machine functions or libraries as an example for virtual machine functions or libraries. It will be apparent to those skilled in the art that other types of virtual machine functions or libraries can be used without limitation.

In accordance with an embodiment, the system provides an enterprise application virtualization solution that allows for centralized governance and control over software and Java applications. Operation teams can define policies, based on application-level service level agreements (SLA) that govern the allocation of hardware and software resources to ensure that quality of service (QoS) goals are met across virtual and non-virtualized platforms. When pre-defined conditions occur, a controller dynamically apportions resources to applications or services by invoking the deployment capabilities of the underlying infrastructure. This allows organizations to take advantage of the computing power available from modern processing systems and hypervisor-based virtualization technology. Applications can be deployed on a pool of virtual resources and dynamically extended or re-configured to meet runtime requirements, without constant monitoring by system operators.

In accordance with an embodiment, application administrators can set policies that govern such features as how many servers must be available in a given domain, the maximum load that those servers should support, the response time required for individual services, and other important Service Level Agreement (SLA) metrics. If any of these parameters are breached, the system can respond immediately by provisioning further server instances, migrating existing instances to more suitable resources, or taking other actions to reconfigure the application's runtime environment.

In accordance with an embodiment, the system automatically maps application activity to the most appropriate resources of the underlying platform, so that in a virtualized environment the system can invoke hypervisor-based services to clone, deploy or to migrate servers; while in a non-virtualized operating system (OS)-based environment, the system can start additional resources wherever they have been defined. The system can also provide application-level monitoring and automation for all Java applications, whether those applications are running virtualized or on a dedicated server. In a typical organization, the information operations can contain a mixture of virtual and dedicated servers (since not all applications can be effectively virtualized and in some cases a mixed architecture may be appropriate). Using the system herein, an organization is able to control and optimize Java applications both at the Java Virtual Machine (JVM) and application server layers, regardless of how and where those applications are running In accordance with an embodiment, the system comprises two principal components: a Controller, and one or more Agents. The Controller maintains a secure repository of service deployments and SLA policies that are monitored by the system, with a high-performance customizable rules engine that allows the system administrator to specify what actions should be taken when those service levels are at risk. The Controller monitors JVM, application and other metrics, and is able to perform configuration changes and provide process control, so that operations teams can automate key tasks aimed at maintaining application quality of service (QoS), such as provisioning new server instances or migrating existing deployments to alternative hardware resources, based on the runtime behavior of applications and the SOA services that underpin them. The Controller can determine optimal resource placement for service deployments and JVM creations by matching service deployment requirements with specific resource pool capabilities. Action pipelines can be defined to allow complex, sequenced activities to be initiated in response to an event or condition and calendar-based rules allow scheduling of actions to be performed on a one-off or periodic basis.

Agents manage the virtualized or non-virtualized resources that make up the application domain to be managed. These can be virtual appliances (for example, WLS-VE) running on hypervisor-based virtualization platforms, dedicated app server, or JVM-based deployments. Agents determine the resource capabilities of the managed resource environment, and provide appropriate process control operations and platform-specific runtime information. Agents collect and aggregate a rich variety of information about the resources and services they monitor, which they return to the Controller.

The Controller and Agents can run within virtual machines, or on dedicated servers. For example, in some embodiments the Controller can run on its own, dedicated server, as can the Virtualized Agent which manages the server instances running in virtual machines on the hypervisor. Virtualized server resources, process control and virtual machine monitoring can be performed via API calls. Both virtualized and non-virtualized resources can be controlled in a single domain. In accordance with a particular embodiment, the system and features thereof are referred to as a Liquid Operations Control (LOC) system. These and other features and benefits are described in further detail below.

Glossary

The following terms are used throughout this document:

Controller—A centralized component or process that gathers data about the operating environment from Agents. The Controller uses the data gathered to enforce policies and to deploy new services in a way that best honors the SLA of all deployed services. The Controller hosts the Administration Console.

Agent—A component or process that provides information about the environment to the Controller, starts and stops processes, and invokes other actions at the request of the Controller. In accordance with an embodiment, the system can use two types of Agents: a Plain Agent, for managing any type of Java process, that renders the resources from the machine on which it resides as a resource pool; and a Virtualized Agent for managing instances of Application Server running in a virtualized environment, that renders the virtualized resource pools as system-accessible resource pools, and can reside on any machine in the operations center that has access to the virtualized environment.

Administration Console—A graphical user interface that an administrator can use to configure, manage, and monitor services in the operations center.

Managed Java Process—A process instance initiated by the system and then monitored.

Action—A software class that can display alert messages in the Administration Console, send notifications, or change the runtime state of a service. Actions can be adjudicated, requiring user input before the system invokes the action pipeline. Actions can be invoked by the Controller as part of enforcing a policy, or manually from the Administration Console.

CPU cycles/Computer Power—A measurement of the CPU resources that a resource pool can supply and that a service needs. The measurement can be normalized across CPU architectures so that a megahertz of processing on an i386 processor is comparable to a megahertz on other types of processors.

Hypervisor—Virtualization software that allows multiple operating systems to run on a single physical computer at the same time.

JMS—Java Message Service.

JMX—Java Management Extensions.

JVM—Java Virtual Machine.

Managed Environment/LOC environment—The collection of all resource pools, services, processes, Agents and Controller in a single installation at an organization.

Machine/Server—Either a physical machine or a virtual machine.

Metric—A numeric runtime value that describes the performance of a process or process group and the resource environment. Some metrics are aggregations or calculations of raw (observed) data. Policies set constraints on metrics.

Physical Host—The physical machine that is hosting a Controller, an Agent or any of the processes that the system is managing, including, virtual machines that the system has started.

Policies—Runtime requirements for a service and actions to take when the service operates outside the requirements. In accordance with an embodiment, each policy comprises two parts: a single constraint and an action or pipeline of actions. Multiple policies can be created for each service. Policies can apply to the resource environment, all processes in a service, to a group of processes (process type), or to a single process.

Process/Application—A program that the system manages. For example, a single application server managed server can be considered a process. From the perspective of the system, a Java process consists of an entire JVM stack and includes any application server and applications being managed.

Process Group/Process Type—A collection of processes in a service for which policies can be written. For example, a process group can contain three application server instances, and a policy can be written that starts all three server instances when the service is deployed.

Resource Pool/Computer Resource—A virtual environment, or a physical environment, in which services can be deployed. Each resource pool provides access to physical computing resources (such as CPU cycles, memory, and disk space) and pre-installed software that a service needs to run. A resource pool also contains a description of the failover capabilities of the machines that host the computing and software resources.

Service/Application—A collection of one or more processes that the system manages as a unit. Each process in a service is a software stack starting from the Java Virtual Machine (JVM) and includes the classes that are running in the JVM. For example, in some embodiments a service can be created for managing a single application server instance on which is deployed a single Java EE application. Alternatively, a service can be created for managing all server instances in a cluster. In accordance with an embodiment, a service specifies requirements for the physical computing resources that are needed to run all of its processes, expressed as a range of CPU cycles, memory, and disk space, an optional set of policies that define an SLA, and actions to take when the service is operating outside of the SLA. Metadata can also be provided that defines the Java classes or other executables that comprise the service processes.

System Environment

In accordance with an embodiment, a system is provided which includes a management framework for virtualized and non-virtualized enterprise Java applications. A layer of abstraction is provided over complex operation environments that enable operation staff to think in terms of supply and demand. The framework also offers a policy-based framework for creating and automatically enforcing service level agreements for Java applications, and allows the system to monitor resources across the operations center and distribute the deployment of Java applications in a manner that ensures the overall efficient use of resources.

On the demand side, the system can be used to organize Java applications (processes) into services. Typically, a group of related processes are organized into a single service and the group is then managed as a unit. Alternatively, one service can be created for each process. On the supply side, the system can be used to organize the computer resources in an operations center into collections of resources, or resource pools. A resource pool can represent a single physical machine or a collection of virtualized resources that are made available through Hypervisor software. In accordance with an embodiment, the system provides an environment for encapsulating an SLA as a collection of requirements and policies. The operation team can define policies based on application-level SLA that govern the allocation of hardware and software resources, ensuring that quality of service (QoS) goals are met across virtual and non-virtualized platforms.

FIG. 1 is an illustration that shows the architecture of a system for deploying and managing software services, in accordance with an embodiment. As shown in FIG. 1, a typical deployment contains a single Controller 101, and multiple Agents 102 and 103 that manage and monitor resources and communicate that information back to the Controller 101. The Controller 101 gathers data about the operating environment from the Agents 102 and 103. The Controller 101 then uses the data gathered to intelligently deploy new services and to evaluate and enforce policies to honor the SLA for all services in the environment. The Controller 101 also hosts the Administration Console 100 that enables an administrator to visually configure, manage, and monitor the environment.

When predefined conditions occur, the system dynamically allocates resources to services. The system then monitors the use of resources across the operations center and distributes the deployment of Java applications in a manner that ensures the most efficient use of resources overall. When a service is deployed, or when a system action requests that an additional process be started, the system examines all resource pools to determine where to host the service or process. To choose a resource pool, the system first eliminates any resource pool that cannot satisfy particular dependencies (such as IP addresses or access to software. For example, if a service requires access to Application Server software, then the system eliminates any resource pools that cannot provide access to Application Server software). After considering declared dependencies, the system then considers the capacity of each remaining resource pool, the SLA of any services that are currently deployed, and the relative priorities declared for each service. It then uses an appropriate algorithm to determine which resource pool to use.

One example is based on most resources available. In this approach the system chooses the resource pool that currently has the most excess capacity. For example, if resource pool A has 600 MHz of CPU and 600 MB of RAM that are currently unused, and resource pool B has 400 MHz of CPU and 400 MB of RAM that are unused, then the system chooses resource pool A.

Another example is based on most efficient use of resources. In this approach, the system chooses the resource pool that has just enough unused resources to satisfy the minimum resource requirements of a deployment request. This algorithm ensures the system is best positioned to handle services whose resource requirements are larger than the current request. For example, if resource pool A has 600 MHz of CPU and 600 MB of RAM that are currently unused, and resource pool B has 400 MHz of CPU and 400 MB of RAM that are unused, and if a service is deployed with a minimal requirement of 200 MHz of CPU and 200 MB of RAM, then the system chooses resource pool B.

System Controller

Figure 2:
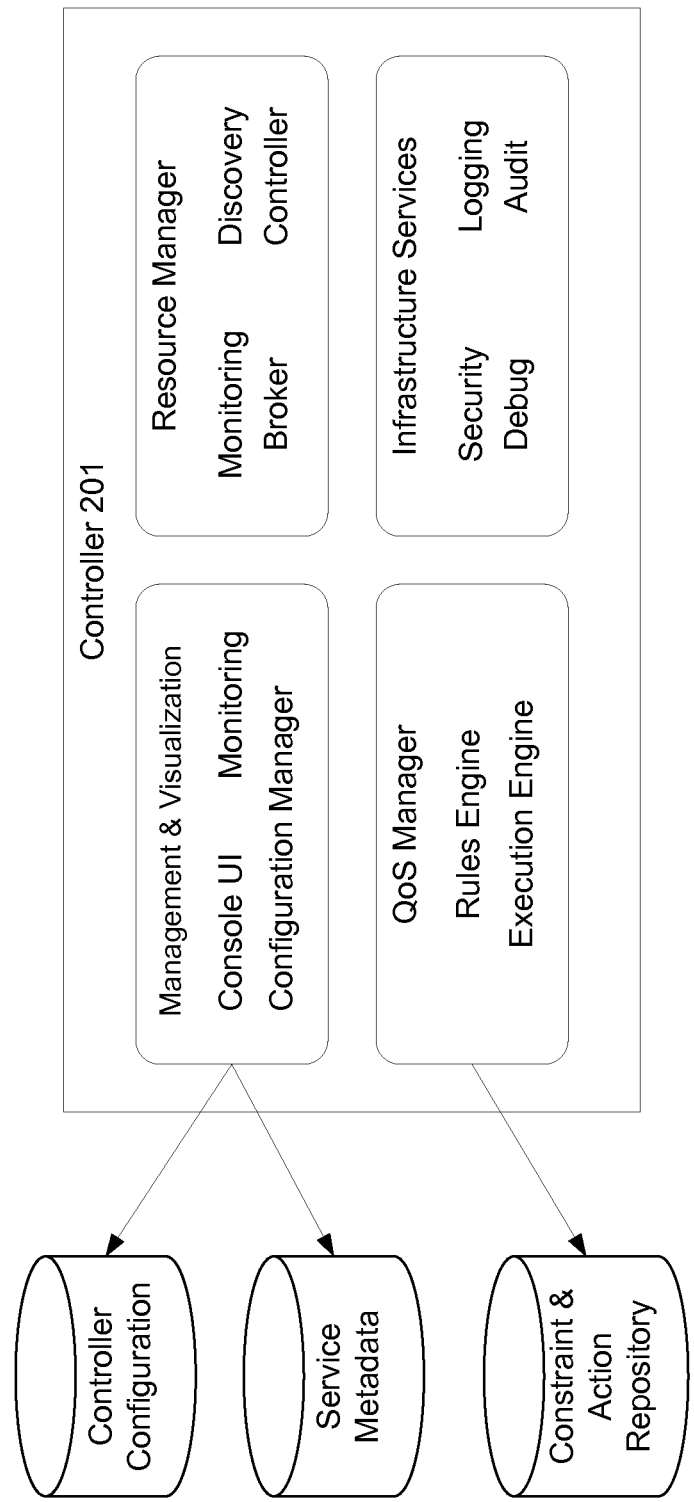
FIG. 2 is an illustration that shows the architecture of a Controller for use with the system, in accordance with an embodiment.

FIG. 2 is an illustration that shows the architecture of a Controller 201 for use with the system, in accordance with an embodiment. Each instance of the system environment includes a single Controller 201. The Controller 201 is responsible for hosting the Administration Console that enables the administrator to visually configure, manage, and monitor the environment; managing resource pools; managing the creation of services; managing the creation of SLA agreements; and, providing logging and audit trails.

To manage resource pools, the Controller communicates with Agents to determine the computing resources that each Agent is capable of allocating and selects appropriate resource pools for deploying services. To adapt the system environment to best meet the SLA of all deployed services, the Controller communicates with Agents to gather metrics. It also compares policy constraints against the metrics and invokes actions when services operate outside the constraints. The Controller configuration, service metadata, and SLA information are stored as XML files and stored locally on the machine that is hosting the Controller.

System Agents

Figure 3:
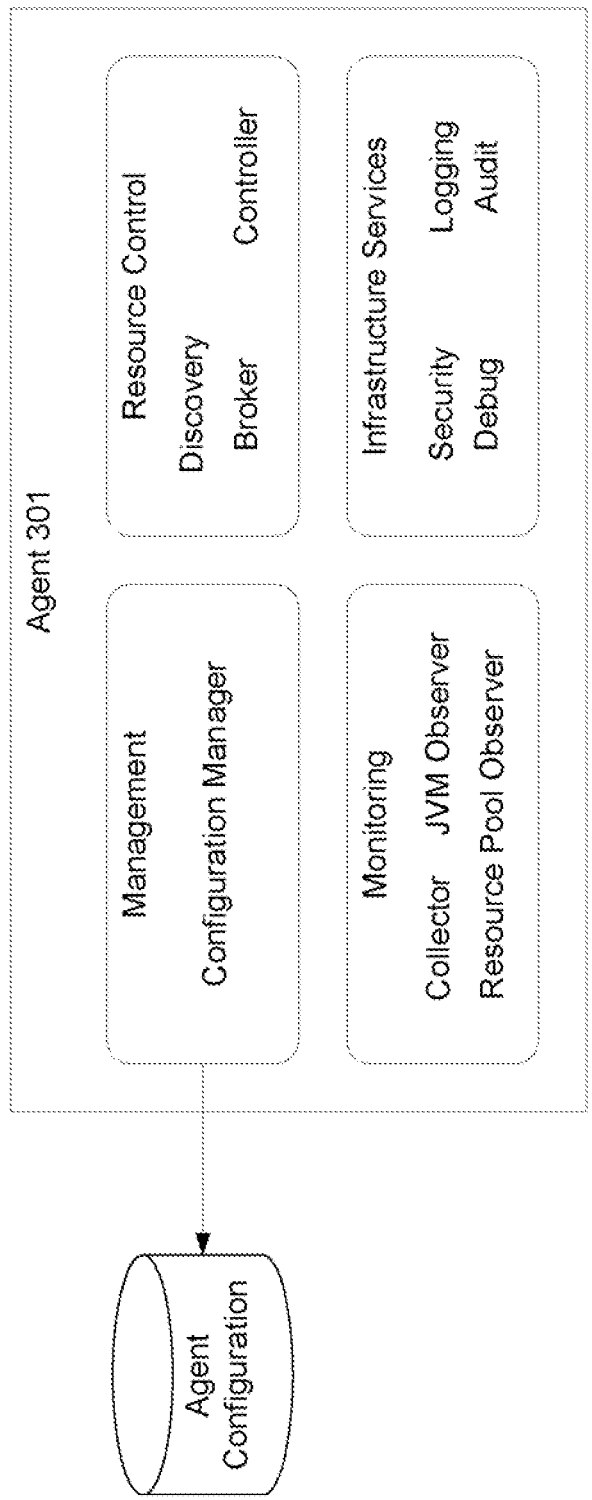
FIG. 3 is an illustration that shows the architecture of an Agent for use with the system, in accordance with an embodiment.

FIG. 3 is an illustration that shows the architecture of an Agent 301 for use with the system. In accordance with an embodiment, an Agent 301 is a standalone Java process that renders the CPU cycles and memory of a machine or a collection of virtual resources as resource pools for use by services. As described above, in accordance with an embodiment, the system supports two types of Agents: a Plain Agent for managing any type of Java process, and that renders the resources from the machine on which it resides as a resource pool; and, a Virtualized Agent for managing instances of Application Server running in a virtualized environment, and that renders virtualized resource pools as system resource pools. Agents can use XML documents to save information about the resources that the Agent exposes for use by the system. Agents can also use unique identifiers for each of the managed processes being managed by that Agent.

In accordance with an embodiment, a Virtualized Agent can communicate with the Virtual Center or similar process, to gather data about the resource pools that are available for use by the system and to manage instances of Application Server. After an Application Server instance starts, the Agent communicates with the Application Server instance to gather monitoring data and invoke management actions.

In accordance with an embodiment, each instance of the system environment includes one or more Agents 301. The one or more Agents 301 are responsible for managing and storing its configuration information; providing ongoing visibility into the amount of resources that the system is using for a given resource pool; controlling the life cycle of JVMs in a resource pool upon request from the Controller; gathering metrics and monitoring data of its instantiated JVMs and making this data available to the Controller; and, providing logging and audit trails.

Administration Console

Figure 4:
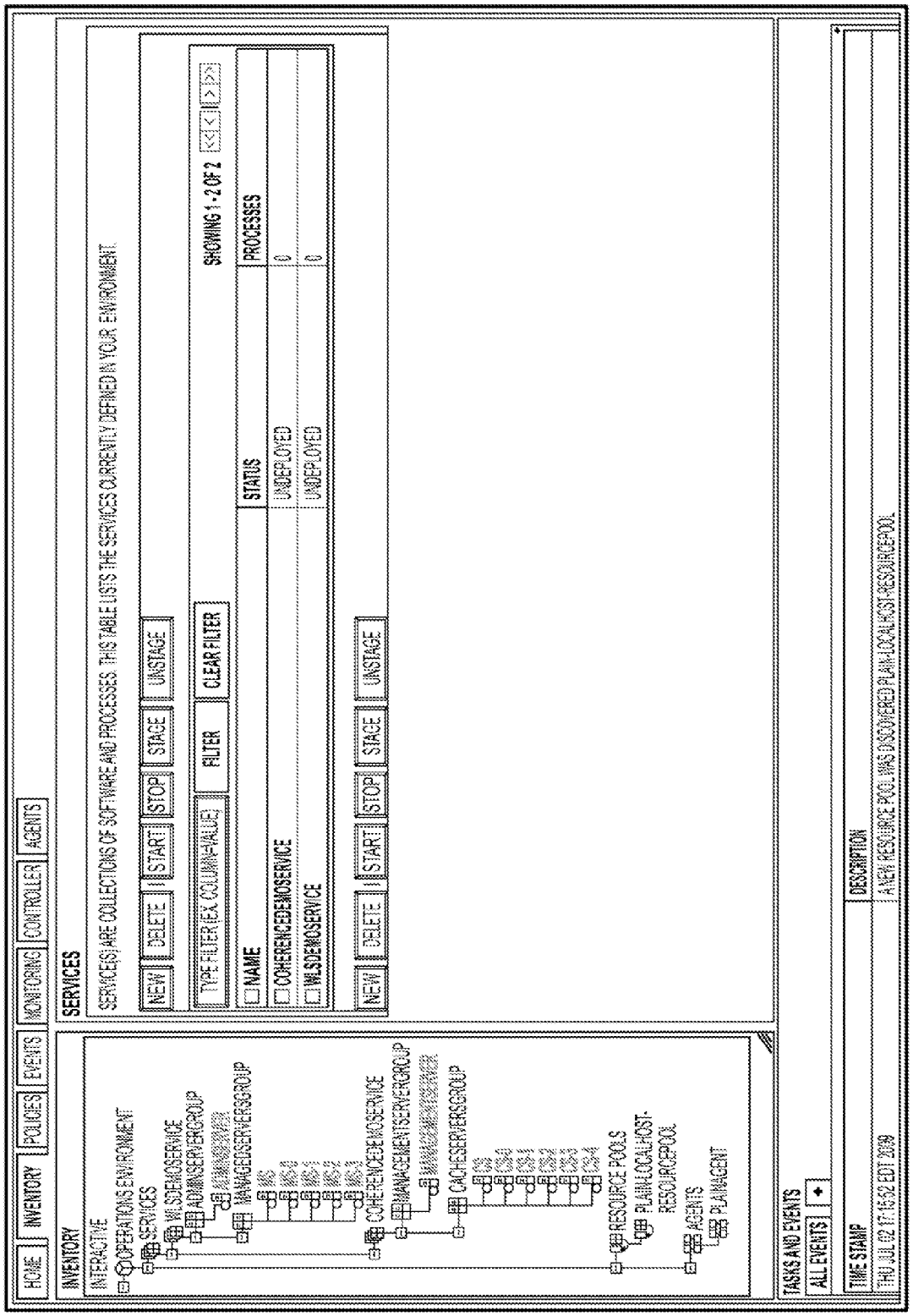
FIG. 4 is an illustration that shows a screenshot of an Administrative Console or interface, in accordance with an embodiment.

FIG. 4 is an illustration that shows a screenshot of an Administrative Console or interface. In accordance with an embodiment the Administration Console is a browser-based, graphical user interface that the administrator can use to configure, manage, and monitor services in the operations center. The interface can be hosted by the Controller, which communicates with Agents to gather monitoring data and to invoke management actions.

In one embodiment, the Administration Console can configure network communications for Controllers and Agents; organize computing resources into resource pools; organize Java applications into services; create policies to enforce SLA for services automatically; configure logging and auditing features; create users and assign them to groups and roles; deploy and activate services; invoke actions to manually affect services; monitor the performance of services; monitor the use of computing resources on machines that host resource pools; and, view Controller log files and security auditing files.

Administration Console and Configuration of Services

Figure 5:
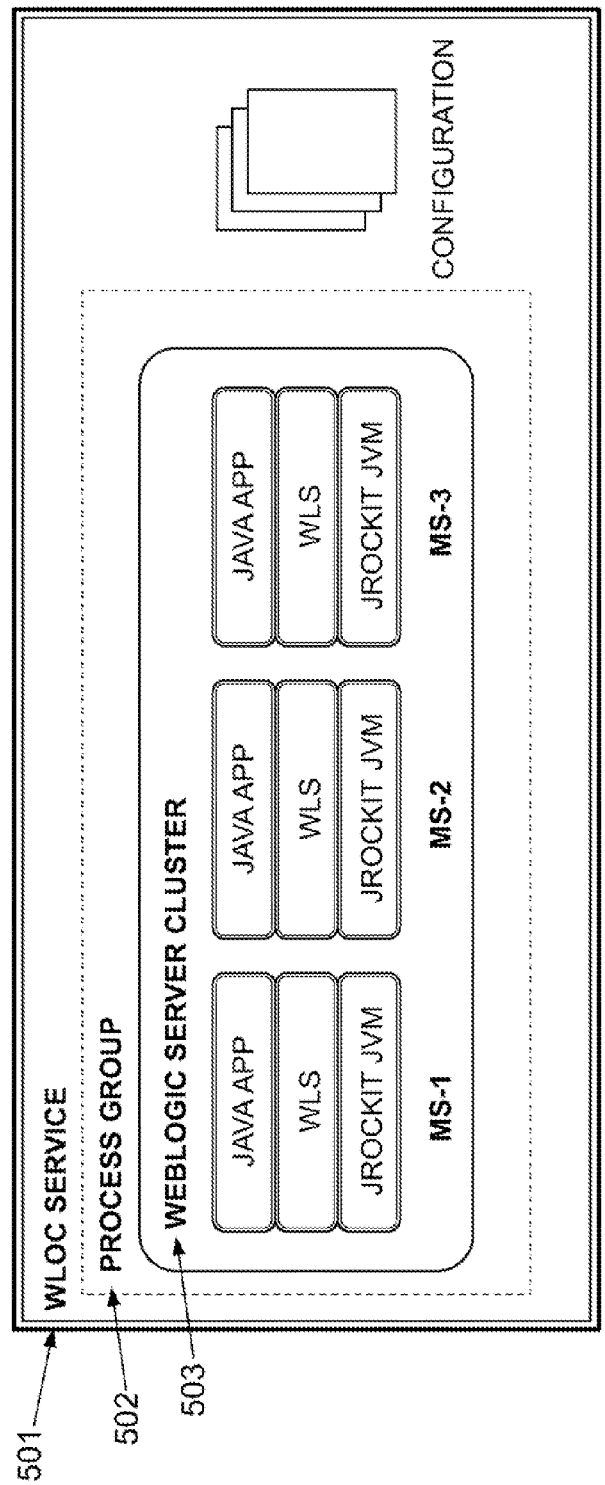
FIG. 5 is an illustration that shows the architecture of a system for deploying and managing software services as process groups and clusters, in accordance with an embodiment.

FIG. 5 is an illustration that shows the architecture of a system for deploying and managing software services as process groups and clusters, in accordance with an embodiment. A service is a collection of one or more processes that the system manages as a unit. Each process in a service is a software stack starting from the Java Virtual Machine (JVM), including the classes that are running in the JVM. Typically, processes that perform the same function are organized into process groups. (For example, all of the servers in a cluster can be organized within a process group). The administrator can specify attributes for each process group such as:

The number of instances of the process groups to create initially and the minimum and maximum number of process instances allowed for the service;

The minimum amount of resources that the process requires and an upper limit of resources that the process can use. The system reserves the minimal resources for exclusive use by the process and grants additional resources if they are available;

A priority for the service, which the system uses to resolve conflicts when more than one service fails to meet its SLA at the same time;

Any information required by the system in order to deploy processes, including the main class, JVM startup arguments, and software dependencies;

A ready metric, which the system uses to determine when a process has been successfully started and can be monitored; and Any software dependencies including the name and location of the software that the processes require to run.

The administrator can also define one or more policies that specify the deployment or runtime requirements (constraints) for the service and the actions to take if the SLA constraint is not met. For example, a policy can be used to expand or shrink a service's footprint in response to the runtime environment. Constraints can be placed on a process, a group of processes, or all processes in a service. In accordance with an embodiment, constraints can be based on a calendar value, or, if the managed processes expose management data through Java Management Extensions (JMX), then by constraining the value of an MBean attribute in the processes.

For example, in FIG. 5, an administrator can create a service 501 that specifies a process group 502 for a collection of externally-facing web services, all of which run on a single application server cluster 503, and can configure the process group 502 as follows:

Resource Minimum=Reserve 400 CPU cycles, 600 MB RAM.

Resource Maximum=Allow services to use up to 800 CPU cycles, 800 MB RAM.

Resource Priority=Specify highest priority over all other services.

Initial Deployment State=Start Administration Server and two Managed Servers.

For example, a policy can be created that starts an additional cluster member during business hours. A second policy can be created that starts two additional members if servlet response time drops below 2 seconds, and that stops the additional members if response time is faster than 0.1 second. When the service is deployed, the system reserves the prescribed 400 CPU cycles and 600 MB of RAM for exclusive use by the service. As the system adds processes to the service, it requests additional resources for use by the service up to the maximum. If the additional resources are currently being used by other processes, the system can remove resources from lower-priority processes, as long as each process retains its minimal reserve.

Administration Console and Monitoring of Services and System Resources

Figure 6:
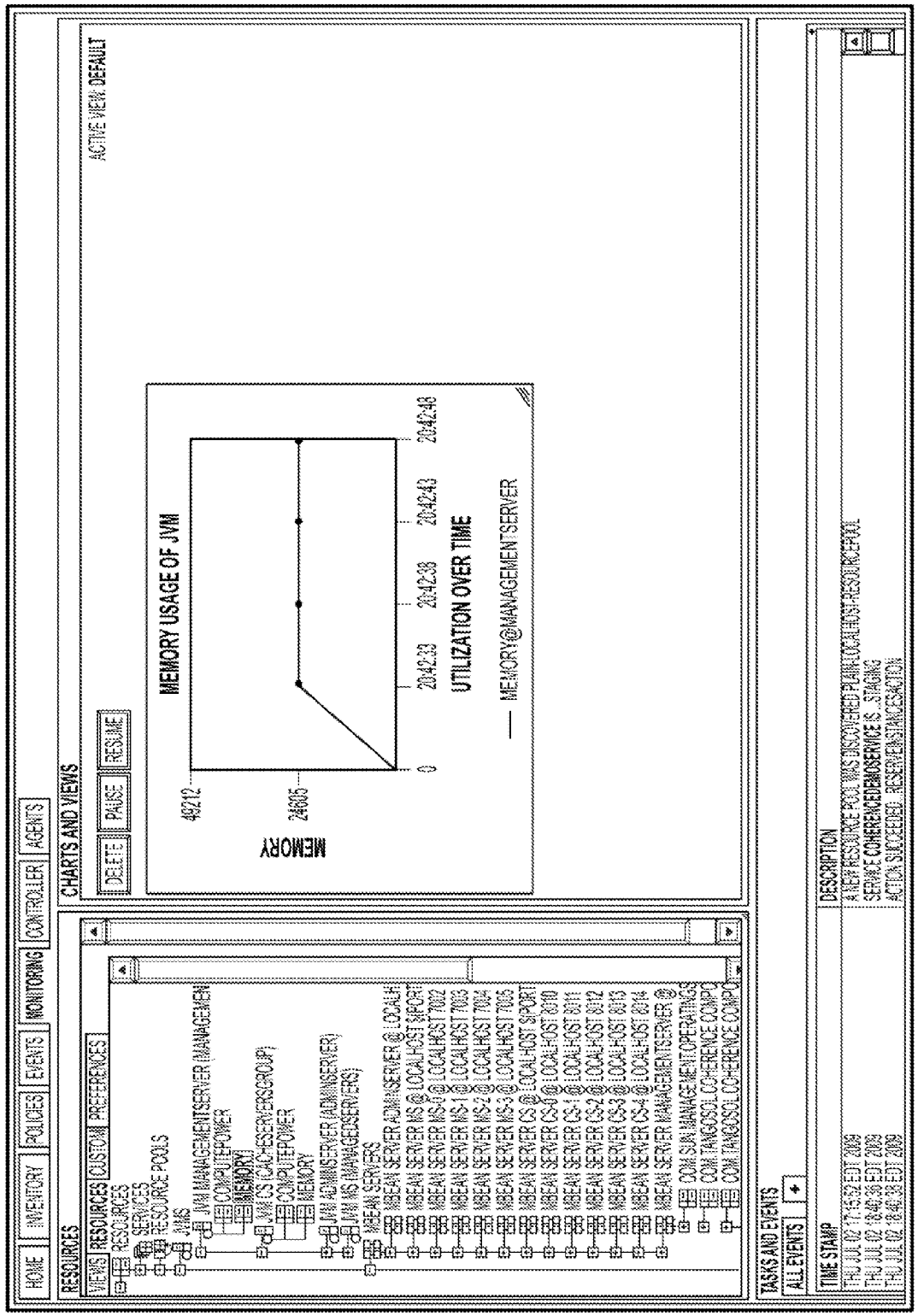
FIG. 6 is an illustration that shows another screenshot of an Administrative Console interface that displays metrics, in accordance with an embodiment.

FIG. 6 is an illustration that shows another screenshot of an Administrative Console interface that displays metrics, in accordance with an embodiment. The performance of system resources can be charted using charts and graphs that describe the amount of resources the service is using from a resource pool relative to the amount of resources available, and the runtime statistics from each JVM within the service.

In accordance with an embodiment, services and system resources can be monitored based on:

Information about events and action that have occurred in the environment and the time that they occurred;

Actions that are currently pending and that require approval;

Notifications that are triggered when a service operates outside of a policy constraint. The administrator can configure the system to generate notifications using Java Message Service (JMS), Java Management Extensions (JMX), Simple Mail Transfer Protocol (SMTP), and Simple Network Management Protocol (SNMP);

Log messages about events such as the deployment of services or the failure of one or more actions; and Audit messages that capture changes to the Controller, Agents, or service configuration.

Administration Console and Security

Figure 7:
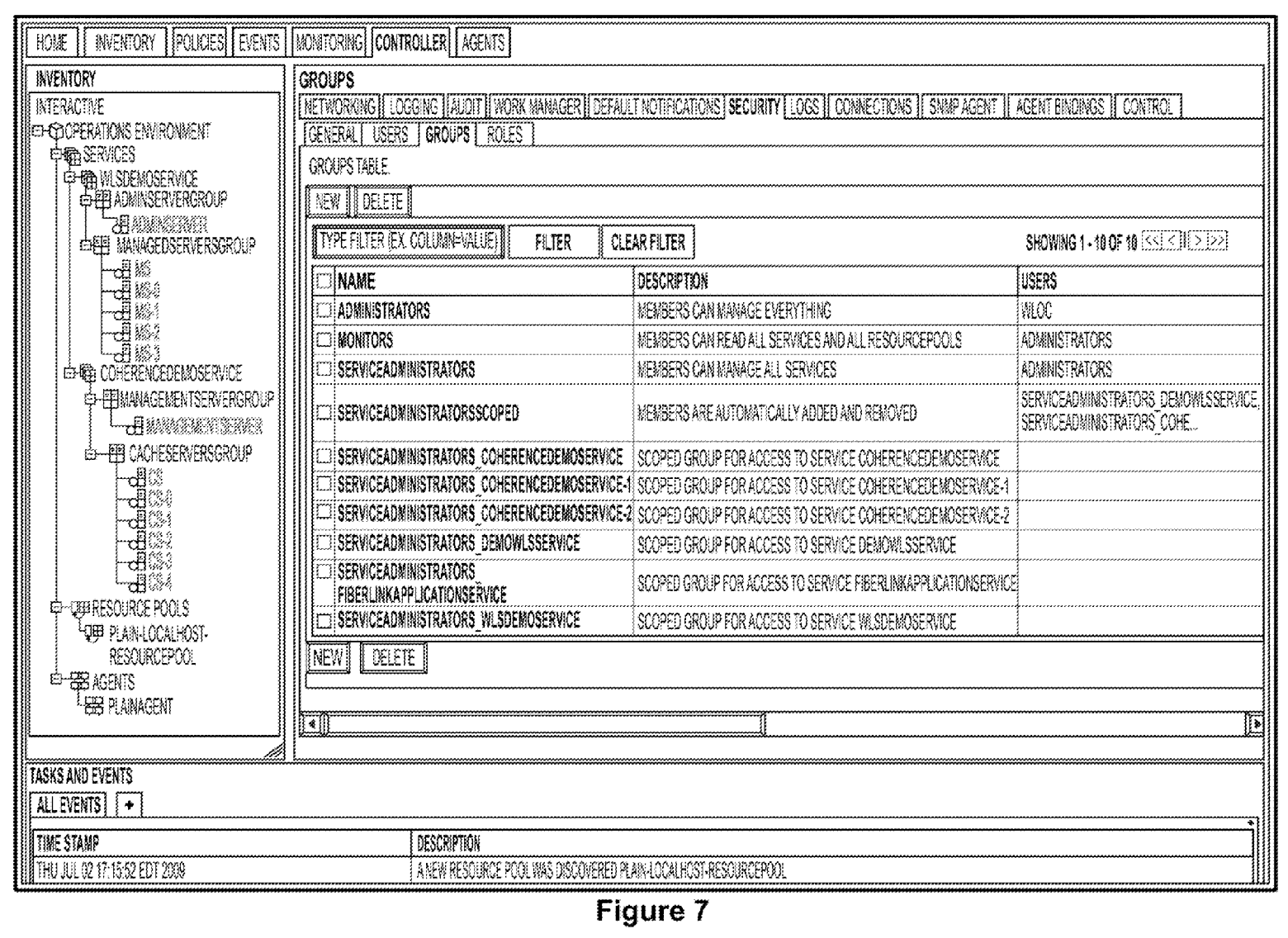

FIG. 7 is an illustration that shows another screenshot of an Administrative Console interface that allows for setting of filters. In accordance with an embodiment, the system uses role-based access control to enable an administrator to assign different levels of privileges to different users or groups. The system also includes a set of security roles with pre-configured access privileges, and groups that can be configured to be in one or more of the defined security roles. An administrator can then create users and assign them to groups, or directly to security roles.

Monitor Service

Figure 8:
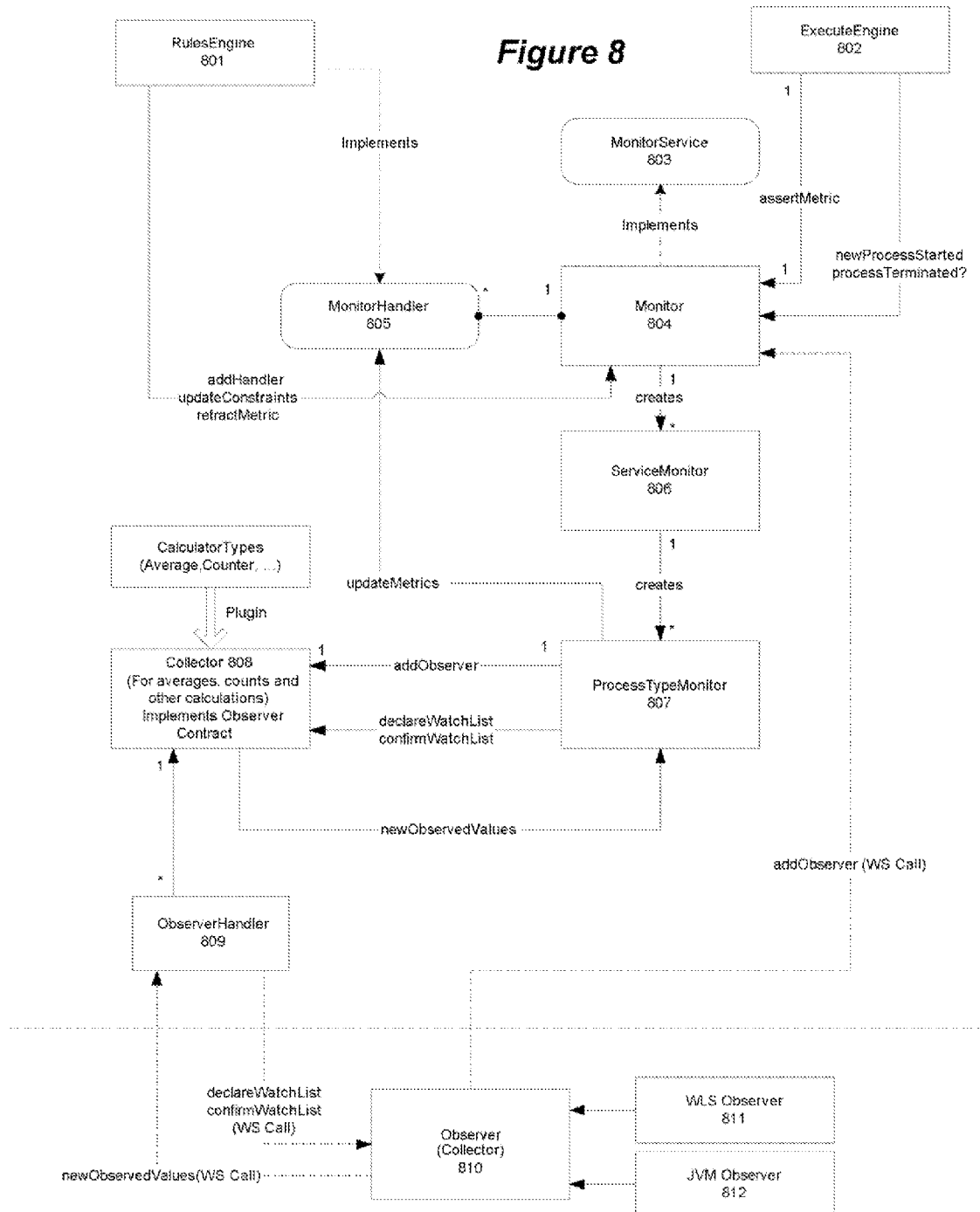
FIG. 8 is an illustration that shows the monitor service component of the Controller, in accordance with an embodiment.

FIG. 8 is an illustration that shows the monitor service component of the controller. The monitoring service provides the infrastructure to obtain system performance information. The monitoring service converts the constraints specified by the users into a watch list. The watch list is a list of all the attributes that need to be monitored for an asset. This watch list is passed on to the observer that observes the asset. The monitoring service also converts all the raw data that is returned from the observers into metrics that are consumed by services within the System Controller. The monitoring service can also aggregate, count or perform special calculations on the raw data that has been observed. In accordance with an embodiment, the system can provide a set of pre-defined functions that the user is able to use to perform these calculations. The monitoring service also handles all the event/action metrics that are generated within the System Controller. The event metrics capture events such as the start of an action, failure of an action, etc. The monitoring service also supports the console for any monitoring information it may need to display.

FIG. 8 also describes the monitor service and its interaction with the other components of the System Controller. In the example as shown in FIG. 8, the Java function calls are indicated by solid lines and the web service function calls are indicated by the dashed lines. The interfaces that the monitor service exposes are shown in the rectangles with rounded corners. The execute engine 802 and the rules engine 801 are components within the Controller. There can also be a console to access the monitoring information.

The MonitorService 803 interface is the core interface of the monitor service that provides all the functions that other components within the System Controller needs to interact with it. The MonitorHandler 805 interface is used to broadcast all the updates of the metrics that are maintained by the monitor service. The rules engine 801 implements the MonitorHandler 805 interface and registers itself with the monitor service 803 using the addHandler call. The MonitorService 803 interface is implemented by the Monitor 804 class in the monitor service. In one embodiment, the monitor service maintains internally a hierarchical structure based upon the service names and process types. This can be indicated by the ServiceMonitor 806 and ProcessTypeMonitor 807 in FIG. 8.

In one embodiment, a collector 808 oversees every ProcessTypeMonitor 807. The collector 808 is responsible for interacting with the observers 810. The Collector 808 also implements the Observer interface. The Collector 808 is responsible for performing calculations on the data that is received from the observers 810. Calculations such as averages, counts, etc., can be performed by the collector 808. FIG. 8 shows the collector 808 in which users can plug in their own functions to perform calculations. In addition, in FIG. 8, the lines drawn between the ProcessTypeMonitor 807, Collector 808 and the Observer 810 represent the Observer contract.

The rules engine 801 notifies the monitor service of the updated constraints by calling the updateConstraints on the MonitorService 803 interface. State metrics are asserted by the execute engine 802 and retracted by the rules engine 801.

When an Observer 810 has been started up, it notifies the monitor service via a web services call to add an observer. When a new observer is added, a new web service end point is created to handle the new observer. The watch list constructed using the constraints is passed to the observer. The observer then calls into the ObserverHandler 809 whenever updated metrics have been observed.

Monitor Handler allows services to listen to updates on all metrics in the monitor service. The updates include all metrics that have been added, removed or changed. There can be a MonitorHandler 805 Interface that is used to broadcast updates of the monitoring metrics to all registered handlers. Components that wish to get the updates of the metrics implement this interface and register them with the MonitorService. The handlers receive updates on metrics as they occur within the System Controller. A filter class is specified when the handler is added to the monitor service. This allows the handlers to receive updates on only the metrics they are interested in.

All registered handlers can receive updates on a separate thread. This ensures that the handlers do not hold up the operation of the System Controller. The handler can be used to gather all updates to metrics. The system can first spawn a new thread (thread-1) and then loop through all the handlers within the new thread. For each of the handlers within the thread, the system can further spawn a new thread (thread-1-a, thread-1-b, etc.) and notify handlers on the thread.

In one embodiment, a MetricsFilter Class can be provided to allow the handlers to specify the metrics that they are interested in. The filter is used to weed out any metrics that the handler is not interested in so that it is not inundated with metrics that are useless to it. The filter allows the handler to specify the service names, process types, process Ids, metric types, instance types and attribute names it is interested in. All except the metric type can be specified in terms of a regular expression. This filter can be updated during runtime.

In one example, the monitor service component can be delivered as two bundles, for instance two OSGI bundles. One bundle provides all the core functionality of the monitoring service. It includes the MonitorHandler and the Metrics filter that were described above. The bundle is registered as an Service Discovery Service (SDS) and can be accessed by linking to it in the arc-config.xml file. This service exposes the MonitorService interface. It exposes all functionality that other services within the virtual environment may want to use. Internally, the monitor service can maintain a hierarchical structure of the services and process types.

In addition, the monitor service can also be made available via a web service. It allows observers to add themselves to the monitor service. This bundle provides the implementation for the deployment of a web service. It also provides a utility class (MonitorWSUtils) that has a simple static function that the observers can call to add themselves to the monitor.

In one embodiment, the MonitorService 803 Interface is the main interface of the monitor service component. It provides methods to add/remove Monitor Handlers, add/remove/change constraints, assert/retract state metrics, access metrics maintained by the monitor service, and add/remove observers.

In addition, for ease of use to call the monitor web service, a utility function can be provided. This utility has a simple static method that can be called. The method encapsulates all the calls to the web service.

In one embodiment, one can add different metric types to a watch list. The monitor service can keep track of the number of times an item was added to the watch list because when they are removed they have to be removed from the watch list only when all additions are paired with removals.

The collector 808 is the component that talks to the observers 810 via the ObserverHandler 809. There can be one collector for every process type in a service. The collector can manage all the observers for the processes that belong to that process type.

In one embodiment, the collector 808 is delivered as an OSGI bundle. It can also be declared as a Service Discovery Service (SDS) and the monitor service can use the service to create collectors for the different process types. The collector service exposes the CollectorService interface. In one embodiment, the collector implements the Observer pattern to keep it consistent with the observers that it is managing.

In one embodiment, the collector can manage multiple observers. A collector is responsible for managing the observers for the processes that belong to the process type that it is associated with. The management responsibilities include adding and removing observers.

In one embodiment, adding an observer involves adding the observer to the list of observers that the collector is managing, providing the observer with the current watch list and providing a web service endpoint that can receive all the metrics. Removing an observer involves taking it out of the list of managed observers, and notifying the process type monitor via the observer contract to clean up the associated metrics.

The collector can also update the observers with the current watch list. During the running of the system, the watch list may be modified. These updates are communicated to the collector via the observer contract. The collector 808 is then responsible for pushing these updates on to the observers that it is managing.

The collector 808 can also perform and is responsible for calculations over metrics received from observers. The collector is notified that it needs to perform these calculations via the watch list. The attribute is tagged with a marker to indicate what kind of calculation needs to be performed.

Rules Engine

Figure 9:
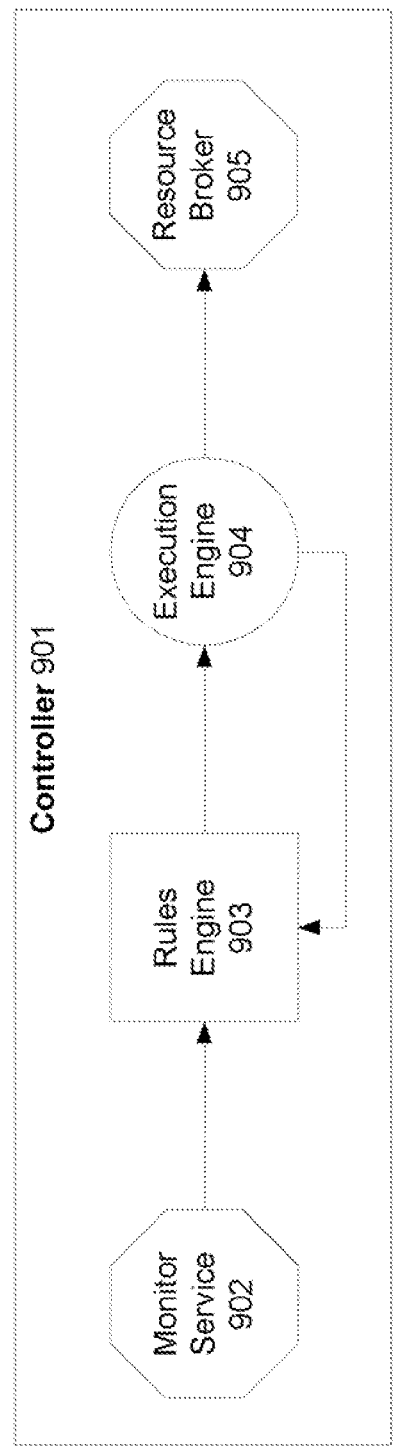
FIG. 9 is an illustration that shows the component pieces of the Controller, in accordance with an embodiment.

In accordance with an embodiment, the Controller manages the processes that constitute services. FIG. 9 is an illustration that shows the component pieces of the Controller 901. As shown in FIG. 9, the monitor service component 902 is responsible for handling all the monitoring information that flows through the Controller 901. In order to optimize all the services it manages, the Controller 901 needs to know how the services are currently performing. This information needs to be monitored and passed back into the controller for it to be able to make decisions on how to tweak the services for optimal performance.

In one embodiment, the Service and Process Type are intrinsic to the constraints, metrics and actions described in this document. The Rules Engine 903 considers these grouping constructs when evaluating the system state and when invoking the Execute Engine 904 to effect change on the system. Furthermore, other subsystems within the Controller 901 also consider Services and Process Types. For example, the process meta-data used by the Execute Engine 904 can be organized by service name and process type name.

A Rules Engine 903 exists to enforce policies specified to the Controller 901 by an administrator. The Rules Engine 903 uses constraints that the administrator defines. The Rules Engine 903, as a subsystem of the Controller 901, can also determine when an action is necessary to satisfy an administrator defined constraint. In addition, the Rules Engine 903 can determine when a deployment or an un-deployment action is necessary. Also, The Rules Engine 903 can prepare context necessary for carrying out actions.

In one embodiment, the Rules Engine 903 is comprised of the set of Rules established by the Administrator to govern the behavior and execution environment of the resources and services running within the virtual environment. These rules are a set of conditional expressions and the corresponding action or actions to be executed in the case where the given conditional expressions evaluate to true.

In one embodiment, the Drools Rules Engine provides the underlying rules support for the Rules Engine 903. Drools Rules Engine is a Rules Engine implementation based on Rete algorithm tailored for an Object-Oriented programming language, such as the Java® language. Adapting Rete algorithm to an object-oriented interface allows for more natural expression of business rules with regards to business objects. Drools Rules Engine is designed to allow pluggable language implementations. In addition, Drools Rules Engine provides for Declarative programming and is flexible enough to match the semantics of one problem domain with Domain Specific Languages (DSL) via XML using a Schema defined for your problem domain. DSLs consist of XML elements and attributes that represent the problem domain. Using Drools concepts, a defined rule is a given set of condition statements combined with a consequence. In the case of the Controller 901, the Drools consequence can correspond to an action that can be handled by the Execution Engine 904.

In addition, the Drools Rules Engine provides extensibility opportunities. The Controller 901 can encapsulate this functionality and provide a new mechanism for extensibility. The following provides more details related to the rules definition and execution in accordance with one embodiment.

In one embodiment, the Rules Engine leverages the full set of Drools capabilities for defining new domain specific languages. The Rules Engine allows for differing rule types that can be based upon the Drools Semantic Module Framework, as needed, for establishing Domain Specific rule languages. The operation and control system of the virtual environment can support the following rule types: Deployment layout rules; Metric Rules (based on monitored metrics, JMX or other sources); Predefined WLS and resource specific Named rules; Workload and capacity on demand rules; Alert and Failure rules (real-time observed data/HA); Calendar Rules; and Log or Event Rule. When any of the provided rule types are used by the Administrator to define a rule instance and bind that rule instance with one or more associated actions, the rule instance can also have a scope associated with it. In one example, this scope can be defaulted based upon the context in which the rule is specified.

In one embodiment, the scope is necessary to allow for the rule instance to be constrained or applied to the appropriate resource in the management domain. This specified scope can allow the Controller to correctly filter which Agent(s) it interacts with for monitoring data and for initiated actions for the given rule instance at execution time. The following scopes can be considered: Global; Service Name(s); Agent(s); Resource Pools; Process Name(s); Process Type; Cluster(s); and Application Server Domain. This ability provides for an ease of specification, such that rules that an administrator wants applied to all services deployed in the virtual environment do not have to be repeated for each configured service. An example of this is surfacing a Notification Action for each deployed service that violates an HA rule. If any running process in any deployed service were to fail, an Administrator would receive an e-mail.

The Rules Engine architecture can support the processing of multiple Rule Sets executing in the same runtime environment. Each Rule Set can be loaded and processed using its own Working Memory, isolating the rules and metric information used for that set of rules from other executing Rules Sets. An example is to define each Service, or a defined group of Services, to be its own Rule Set. On the other hand, it is also possible to maintain all Rule Sets in the same working memory for evaluation. Each Rule Set establishes the set of related rules that is exercised at the same time, with the same context. Drools uses the concept of Working Memory to define the set of runtime classes and data that the rules in the rule set will evaluate against. As part of runtime processing, the Resource Monitor interacts with the Rules Engine to provide the metrics and alert events it is receiving. The Rules Engine populates Working Memory with this information.

At the appropriate time, either immediate, or on a timed basis, or as initiated by some internal state change detected in the managed domain, a request is made to trigger Rule evaluation. The Rules Engine exercises all of the rules in the rule set against the established data in Working Memory. For each and every rule that evaluates to true, the Rules Engine informs the Execution Engine and the configured actions are initiated.

In one embodiment, Rule evaluation is triggered whenever a new metric is provided to the Rules Engine and placed in Working Memory. The concept of rule prioritization is provided to affect the order of rule processing at the Administrators discretion. This helps to handle the varying nature of the different rule types. A rule-priority can be introduced in Rule configuration.

Consideration is given for controlling or throttling Rule Sets evaluation. Many of the actions supported in an operational environment require significant time to complete. The Controller wants to throttle or delay the evaluation of additional Rules that directly relate to the ongoing action or actions. Therefore a mechanism can be provided to allow for an individual rule or set of rules to be disabled. This mechanism can be useful when introducing new rules into the currently executing environment.

In one embodiment, the Rules Engine 903 provides the RulesEngineService API, a public interface that can be used by other subsystems in the Controller 901 such as the Configuration subsystem and the Trigger Service. External access to the Rules Engine 903 can be made via either the console or configuration subsystem. Monitoring of Rules Engine state can be done via the Monitoring subsystem. For example, public access to configure the Rules Engine can be done via the Configuration Service. In addition, public access to monitor the Rules Engine 903 can be done via the Monitor Service 902. The Rules Engine service can assert its monitoring information to the Monitor Service 902. In one example, the RulesEngineService is an OSGi service within the Controller 901 which provides APIs for defining user services and associating constraints on process types with those services.

The RulesEngineService API provides interfaces to add, remove and change process type constraints for the services. The RulesEngineService API uses the information provided by the Monitor Service 902 to determine when action is necessary. The RulesEngineService API also tells the Execute Engine 904 when action is necessary and provides context information which may be used in performing the action.

Internally, the Rules Engine 903 can keep System Performance Metrics, Constraints, EventMetrics, and Action Metrics. Here, System Performance Metrics are passed in from the Monitor 902. EventMetrics are related to Events and are asserted internally by the Rules Engine 903. ActionMetrics are related to Actions and are asserted externally by the Execute Engine 904. In addition, the Rules Engine 903 keeps a data structure that tracks the existing Services, Process Types, and Process instances. The key elements of this data structure are SystemState, ServiceState, and ProcessTypeState.

In one embodiment, the Monitor 902 provides system performance Metrics to the Rules Engine 903. When Constraints are added to the Rules Engine Service, the Rules Engine Service passes the Constraint data on to the Monitor which uses the Constraint information to generate a watch list for observers. The Monitor 902 can convert observation values returned from the Observer based on the watch list into Metric values.

In one embodiment, all of the metric data, including the action and event metrics, can be visible from the monitor service 902. The constraint information used by the Rules Engine 903 is available from the configuration service. Some of the information from the state data structure is available from the RulesEngineService interface.

Execution Engine

In accordance with an embodiment, the Execution engine provides a programming environment where both built-in actions and third party supplied actions can run to perform the automated IT behavior. Examples of built-in actions include starting and stopping processes, raising alerts to administrators, and initiating configuration changes.

The Execution Engine provides the ability for actions to be initiated directly via the Console, or externally supported Web Services. One embodiment can dynamically manage an adaptive environment. The adaptive management is based upon the defined set of rules for monitoring the environment and the corresponding set of actions that are initiated to adapt. This can be as a result of rules based upon defined constraint violations or rules based upon a schedule or calendar. In one embodiment, the combined rules and actions provide a framework for delivering the quality of service demanded by the deployed services, or meeting the service level agreements provided by the resource providers.

The Execution Engine executes Actions to fulfill constraints. The administrator can configure a Pipeline to define a set of Actions and execute them. The Execution Engine executes the Action(s) in serial or parallel based on how the Pipeline is configured. The Execution Engine can alert the Administrator when Actions are executed. The Administrator can also configure the Action(s) or the Pipeline(s) for adjudication. The Execution Engine can wait for the Administrator to accept or reject the Action(s) or the Pipeline(s) based upon the adjudication configuration on that Action(s) or Pipeline (s). In one embodiment, the Execution Engine uses a Resource Broker to perform resource control Actions. The Administrators of the operation and control system for the virtual environment can also select the Action(s) or the Pipeline(s) and force execution on them from the Administration Console. The Execution Engine Service can be an OSGi service that can be used by the other services or bundles in the Controller for initiating Action execution.

Figure 10:
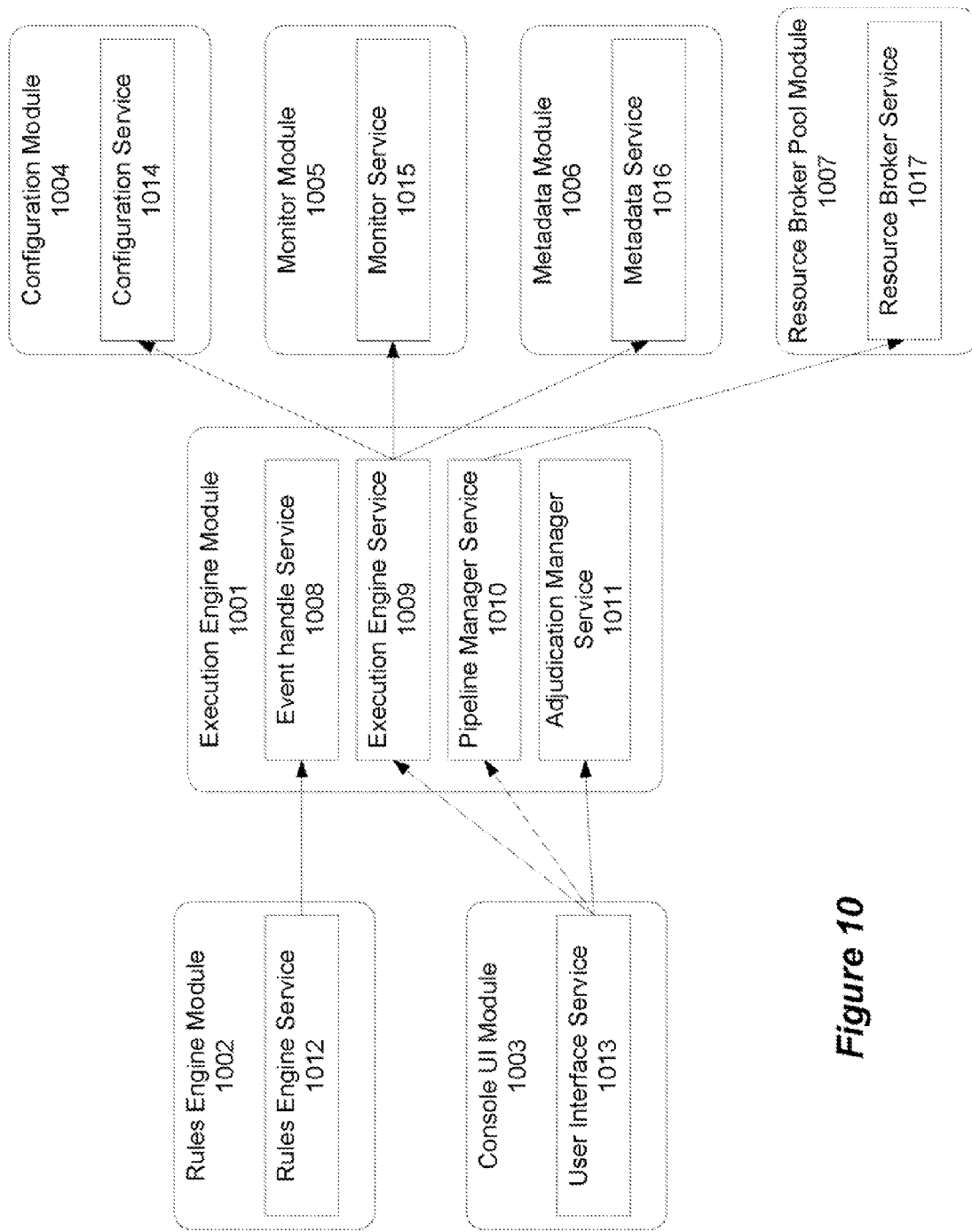
FIG. 10 is an illustration that shows how the Execution Engine Service is dependent with the other services provided by the other components in the Controller and how the other services provided by the other components are dependent on the Execution Engine Service.

FIG. 10 shows how the Execution Engine Service is dependent with the other services provided by the other components in the Controller and how the other services provided by the other components are dependent on the Execution Engine Service. As shown in FIG. 10, the Execution Engine Module 1001 includes Event Handle Service 1008, Execution Engine Service 1009, Pipeline Manager Service 1010, and Adjudication Manager Service 1011. The Event Handle Service 1008 handles an event generated from the Rules Engine Service 1012 and passes the event to the Execution Engine Service 1009. The execution Engine Service 1009 uses the Metadata Service 1016 to obtain the associated actions with the event. Then, the Pipeline Manager Service 1010 can use the Resource Broker Service 1017 to execute the resource related operation.

In one embodiment, the Execution Engine Service 1009 prepares action(s) for execution and performs execution when an Event is fired either by the Rules Engine or by the Administrator Console. The Execution Engine Service 1009, when it receives Event(s), can find the relevant Action(s) or Pipeline(s) from the Application Metadata, and registers the Event with the Pipeline Manager. The Execution Engine Service 1009 also provides APIs to get to the other services such as the Adjudication Manager Service 1011, or the Pipeline Manager Service 1010 provided by the Execution Engine.

In one embodiment, the Execution Engine Service 1009 provides APIs for initiating the Action or Pipeline execution. In addition, the Execution Engine Service 1009 provides access methods to get to the Pipeline Manager. Also, the Execution Engine Service 1009 provides APIs to register Event(s) and corresponding Action(s) with the Pipeline Manager. Registration implicitly creates a Pipeline. Also, the Execution Engine Service 1009 provides access methods to get to the Adjudication Manager. Also, the Execution Engine Service 1009 provides access methods to get to the Resource Broker Service so that other Execution Engine internal classes can use this service for making process control operations.

In one embodiment, the Execution Engine Service 1009 is initialized when the Controller is being booted. The initialization is based on services, such as Resource Broker Service 1017, Application Metadata Service 1016, Monitor Service 1015, and the Work Manager Service. The Resource Broker Service 1017 is used to make process control operations. The Application Metadata Service 1016 can get to the application configuration metadata for starting up processes in the application. The Monitor Service 1015 can assert metrics, and the Work Manager Service can schedule notifications or other such operations onto different threads.

Metrics

Figure 11:
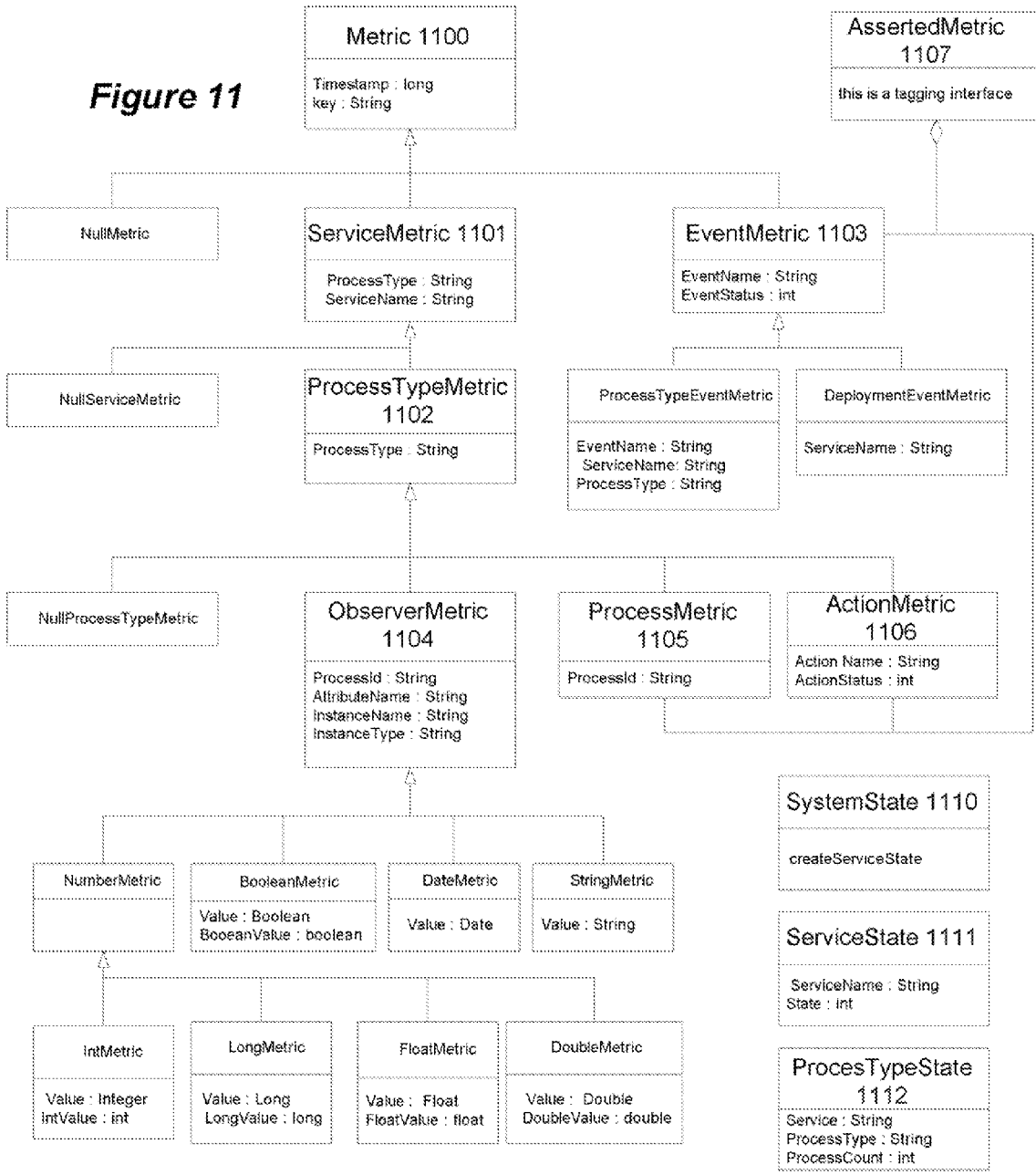
FIG. 11 is an exemplary illustration of Metric class diagram in accordance with an embodiment of the invention.

FIG. 11 is an exemplary illustration of a Metric class diagram in accordance with one embodiment. In this example, the type hierarchy of the metrics package mirrors that of the constraints package.

ServiceState 1111 is a Metric type that provides metadata about a service, such as its priority. ServiceState 1111 can be used by the Rules Engine to decide whether and when to send certain events to the Execute Engine. In addition to the general Metric types 1100, there are other types for holding state about the system in the metrics package. These types can be used by the Rules Engine to keep derived information about the system.

For example, when the Rules Engine sends an event to the Execute Engine, it can simultaneously generate for itself an EventMetric 1103 with a value of EVENT_STARTED. When the Execute Engine has finished processing this event, it changes the value to either EVENT_SUCCEEDED or EVENT_FAILED. Such information is used to prevent redundant ArcEvents from being passed to the Execute Engine while it is in the midst of processing. The EventMetric 1103 can be dynamically updated. In one example, the Rules Engine is automatically notified via Java Beans PropertyChangeSupport when it is modified.

For a given event, the Execute Engine can perform one or more actions. For each action, the Execute Engine generates an ActionMetric 1106 and asserts it to the Monitor so that the Rules Engine may track progress of individual actions. Similar to the EventMetric 1103, ActionMetric 1106 can also be dynamically updated. Another type of AssertedMetric 1107 is the ProcessMetric 1105. The ProcessMetric 1105 is asserted to the Rules Engine whenever a process is started. The Rules Engine uses this information to determine whether a service is within its process boundaries. ProcessMetrics 1105 can be created when the system restarts. EventMetric 1103, ActionMetric 1106, and ProcessMetric 1105 can all implement the tagging interface AssertedMetric 1107. The Rules Engine can assert the AssertedMetrics 1107 to the Monitor Service so that the Console or other tools can view them.

Constraints

In accordance with an embodiment, a Constraint is a user defined service level agreement (SLA) for some discrete entity which is captured by a Metric or states which are derived from metadata or other Metrics. Each Constraint instance has a unique name within the operation and control system of the managed environment in order to identify itself. The constraint types loosely follow the scoping organization of things being managed by the operation and control system of the virtual environment: System, Service, and Process. Constraints are evaluated whenever new or changed Constraints and/or Metrics are passed into the RulesEngineService. After each evaluation, depending on the result, events may be sent to the Execute Engine.

The Rules Engine Service describes an interface that is used to add constraints to the Rules Engine. In one example, a set of interfaces for defining constraints that are passed to the Rules Engine Service.

Figure 12:
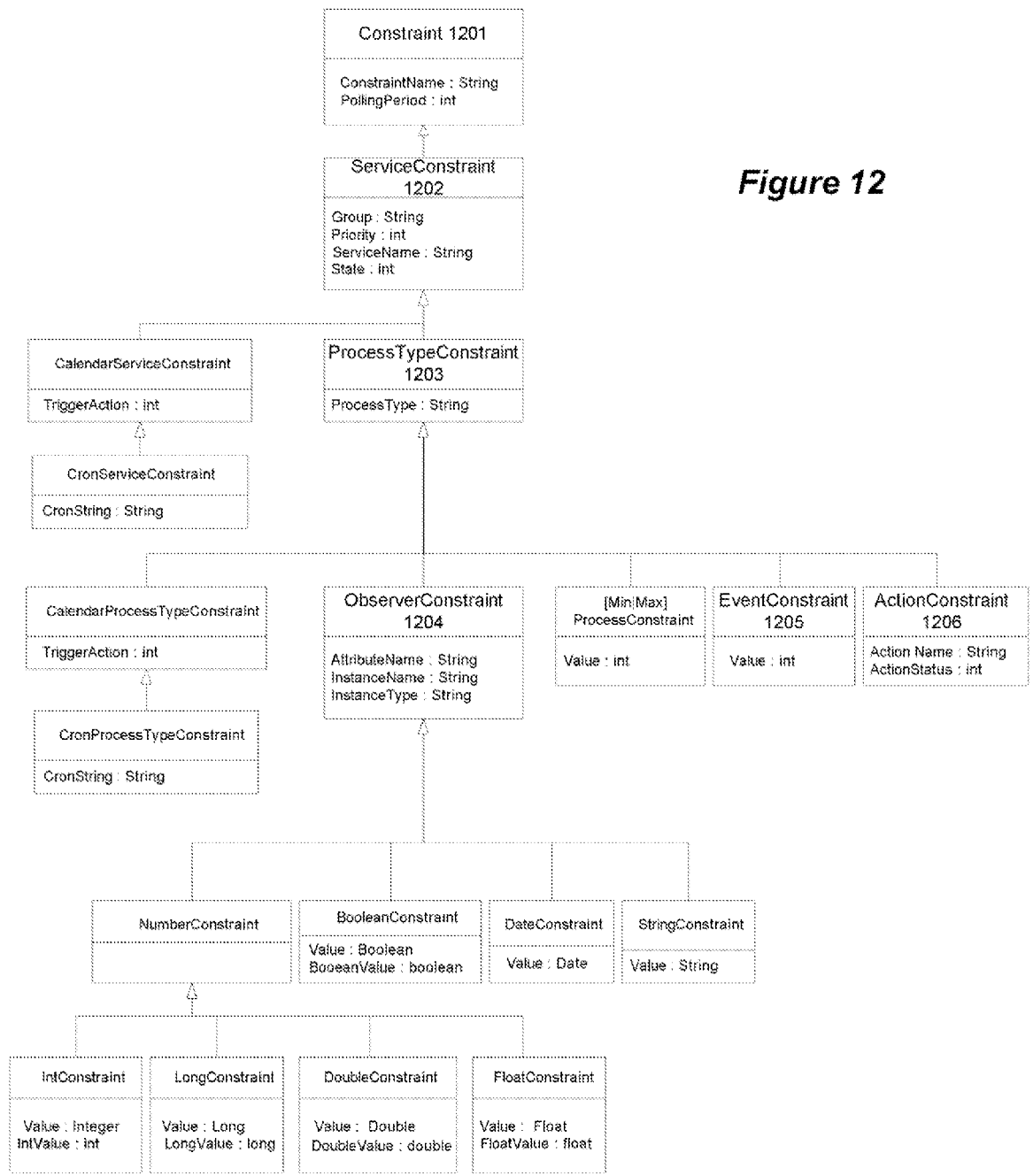
FIG. 12 is an exemplary illustration of Constraint class diagram in accordance with an embodiment.

FIG. 12 is an exemplary illustration of a Constraint class diagram in accordance with one embodiment. It shows the hierarchy of Constraint and all its sub-types. ServiceConstraint 1202 is a specialization of Constraint 1201 which is tied to a specific Service. The ServiceConstraint 1202 has a State attribute which defines to which deployment state the constraint can be applied. The deployment states are defined in the ServiceState class. The State attribute of the ServiceConstraint is compared with the State attribute of the ServiceState for the service to determine if the constraint should be applied. A ProcessTypeConstraint 1203 is a specialization of ServiceConstraint 1102 which is tied to a process type within a service. ObserverConstraint 1204 is a specialization of ProcessTypeConstraint 1103 which is tied to a specific Metric that is provided by the monitor. There are specializations of ObserverConstraint 1204 for various primitive types—IntConstraint, LongConstraint, DateConstraint, etc—which are used by the Rules Engine for matching with corresponding Metric types. ObserverConstraints 1204 have a helper method called checkMetricValue which is used by the Rules Engine to compare a metric value—which it provides to the method—with the expected value of the constraint. This allows the Rules Engine to treat all constraint types generically and should make adding new constraint types easier.

In addition to ObserverConstraints, there are two special kinds of constraints for dealing with the results of event handling (EventConstraint 1205) and individual actions (ActionConstraints 1206) performed by the Execute Engine. When the Rules Engine finds a Metric that does not satisfy a certain Constraint, the Rules Engine sends an event to the Execute Engine. The Execute Engine can then perform one or more actions related to the event. The Execute Engine can post ActionMetrics to the Monitor Service which, in turn, posts them to the Rules Engine for each action. The Execute Engine can also update EventMetrics corresponding to the event handling as a whole.

Events

In accordance with an embodiment, when the Rules Engine determines that a Metric does not comply with a Constraint that has been defined it can send an Event to the Execute Engine to perform some action. In one embodiment, each event generated by the rules engine carries with it information necessary to handle the event including the scope of a constraint failure that caused the event.

Figure 13:
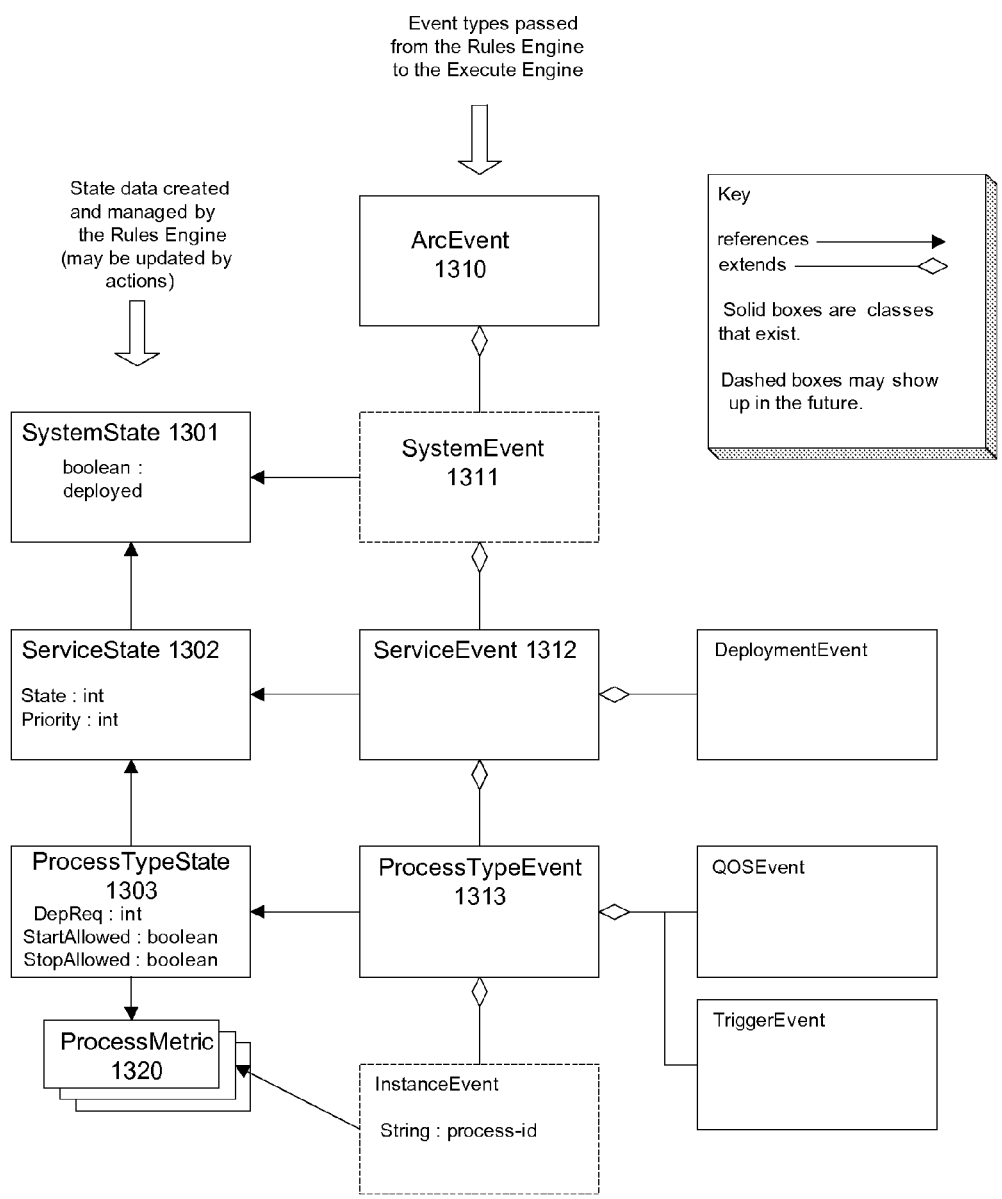
FIG. 13 is an exemplary illustration of Event State diagram in accordance with an embodiment.

FIG. 13 is an exemplary illustration of Event State diagram in accordance with one embodiment. As shown in FIG. 13, the events can carry references to state data objects created and managed by the Rules Engine. The state data objects includes a hierarchy of SystemState 1301, ServiceState 1302 and ProcessTypeState 1303 objects. For example, the ProcessTypeState 1303 has attributes that indicate whether a process is allowed to start or stop, as defined in ProcessTypeEvent 1313. Also, a ServiceEvent 1312 refers to a ServiceState 1302. In addition, a SystemEvent 1311 refers to a SystemState 1301. In one embodiment, all these attributes are calculated during rules processing.

FIG. 13 also shows the basic event types and the state types to which they can refer. Note that the hierarchy data structure allows one to traverse to higher level objects if needed. For example, if the ProcessTypeState 1303 object is given in the event, the ServiceState 1302 object is available as well. Also, the elements of this data structure can be asserted into the working memory of the rules engine. The Rules Engine can detect changes to attributes that affect rules.

In one embodiment, a set of interfaces defines the events which the Rules Engine can provide to the Execute Engine when a constraint has failed. There are different event types corresponding to different combinations of Metrics and Constraints. These event types carry different information depending on the nature of the constraint failure. The ArcEvent 1310 carries with it information that may be used for handling the event. This information may be used to look up metadata related to the problem as well as to determine which actions should be taken. In addition, the information from the Constraint may be used when modifying the EventMetrics or creating the ActionMetrics described below. A ServiceState 1301 object is passed along with the event. This is used when the action requires service wide action, such as deployment. The ServiceState 1302 object has information about the runtime state of the service including references to all of the ProcessTypeState 1303 objects for the service.

There can also be a system wide event. For example, load balancing support can be modeled with events that include system wide information associated with a SystemState 1301 object. There are different kinds of events which carry different kinds of information, the Execute Engine can ensure that the actions applied are appropriate for the event type that is passed to it.

Events can be fired in a prioritized manner. Priorities are assigned to each service as well as to each constraint within a service. When multiple constraints are failing, those associated with higher priority services are fired first. Within the same service priority, constraints of the highest priority can be fired first. In one example, when there is an event in progress for a particular constraint associated with a service and process type, the Rules Engine does not produce another event for the same constraint.

The Rules Engine can assert an EventMetric just before sending an event to the Execute Engine. The Execute Engine can modify this metric when the event handling is complete. The Rules Engine can clean up any EventMetrics in a completed state prior to the next rule evaluation cycle. In one embodiment, EventMetrics can age-out rather than be cleaned up each time the Rules Engine evaluates the rules.

Actions

In accordance with an embodiment, the Action is a contract or a public interface defined by the Execution Engine. The Execution Engine expects an object of type Action while initiating the execution, and, hence, every Action being initiated can implement this contract. The Administrators may define custom Action(s) and those custom Action(s) can implement this contract as well. The Action class provides the typical data structure that is needed for the execution when a constraint fails. In one embodiment, the Action provides API to execute the action. In addition, the Action provides an API to associate with the Application Metadata. Also, the Action provides API to get the Application Metadata. Also, the Action provides API to get the state of the Action.

In some embodiments, built-in and third party provided actions are written as Java Beans or Plain Old Java Object (POJO). The operation and control system for the virtual environment can supply JavaBeans that start and stop JVM instances, raise alerts, initiate configuration changes etc. In one example, a third party can write third party provided beans which call out to third party software or implement custom logic for their environment.

In one embodiment, the operation and control system for the virtual environment provides action classes for common use cases and coding is not required in these scenarios. The operation and control system can invoke these actions from both the Controller Console when associated with defined Rules. In another embodiment, these can be externally exposed via a set of Web Services so as not to limit Administrative control to the provided Controller user interface.

There can be different types of actions, such as Deployment Actions, Notification Actions, Configuration Actions, and Third Party Actions.

Deployment Actions are those that initiate deployment or undeployment of the service. Deployment Actions include Process Control Actions, which manage the resources, such as Starting, Stopping, Suspending or Resuming the application. In addition, Deployment Actions are capable of expanding or shrinking resources such as CPU, memory. This refers to the changing of the resource agreement for an application or for a process instance of an application. Also, Deployment Actions can be instance migration actions such as taking a snapshot of a process instance and starting it on another resource. These actions are all pre-defined actions. The Execution Engine can trigger these actions when a set of rules met in the rules engine matches to either one of these canned actions. Notification Actions are those that initiate alerts by sending notifications. Notification Actions can send notifications through a SNMP trap; SMTP; JMX; or JMS message. Configuration Actions are those that can be executed as a result of the Administrator changing the configuration for an application or for a process instance of an application. For example, Configuration Actions are capable of changing the Execute Queue size of an Application Server process instance of a service; shrinking or expanding the JDBC connection queue size of an Application Server process instance of a service; changing the configuration of web server plugin of a service; and deploying or undeploying a J2EE application in an Application Server process instance of a service. The Administrator can define Third Party Actions in the Action contract and they may be totally unknown to the container.

In one embodiment, the metadata necessary to perform an action for a given rule is part of the binding. It can be beneficial to define default metadata for a given action. An example is the ability to configure a default SMTP-Notification action, such that whenever any action was initiated as a result of a successful rule evaluation, an e-mail notification would be delivered to the configured addresses for this with the defined subject and message body.

In one embodiment, actions are configurable at different scopes with appropriate instance data specified for a given scope. The Administrators can configure actions anywhere as in a Global scope. An example for the globally scoped actions is to allow the Administrator the ability to alert the Administrator via email when there is a successful stop action execution of any process or any application. Also, the Administrators can define the Service Scoped actions. An example for the Service Scoped actions allows the Administrator the ability to manage resources for an interested service. Also, the Administrators can define the Process Type Scoped actions. An example for the Process Type Scoped actions is to allow the Administrator the ability to manage the resource for an Application Server Cluster. Also, the Administrators can define the Instance Scoped actions. An example for the Instance Scoped actions is to allow the Administrator the ability to manage resources for a specific application Server instance of a service.

In one embodiment, the actions provide extensibility. In one example, the execution engine, as well as Resource Controller in the Agent, can be built upon a Spring Framework to allow for ease of extensibility. The Spring Framework offers features required to create complex business applications effectively outside of the programming models on the Java platform. The Spring Framework leverages an existing popular and lightweight container, allowing for time spent on value-add rather than reinventing the technology. The Spring Framework does not require the developers to learn a new programming model. The operation and control system for the virtual environment can provide actions as POJO beans, which are separated from the Controller runtime, making it possible to ship updated or additional actions without modifying the Execution Engine component. User can have a simple POJO model for writing custom actions or plugging in third party products when this is exposed as an extensibility point. In addition, Spring Framework's POJO beans can be unit tested outside of the Controller. Also, Spring Framework separates the metadata and configuration from the implementation logic and provides an easy way for a third party to plug-in debugging or audit point cuts. As an example, action classes can leverage Spring Framework's dependency injection support to manage their external references. For instance, an action class which logs a message to a database can be injected with the JDBC DataSource reference.

In one embodiment, the Controller can track the status of single actions or actions that are part of an action pipeline. For example, the Controller can leverage some Audit events as part of the tracking and reporting. There can be both long-running single actions and certainly for long-running pipelines, the Controller can represent the status of each of these actions back to the Administrator so that the Administrator is kept aware of the activity in progress within the adaptive environment. The execution engine can provide this tracking ability for any and all actions that it initiates. As an example, the execution engine can provide the tracking ability that is roughly equivalent to the capabilities of the TaskRuntimeMBean functionality in an application server which is used to track and report status on long running activities. For the operation and control system in the virtual environment, an initiated Action can surface information that includes: Start time; Action type; Current or completed duration; End time; Action Status (progress state, succeeded, failed); and, Exception (on Failed Action Status).

In some embodiments, for an action pipeline, this can either be represented as a single TaskRuntimeMBean with an array of task entry info listed above along with an encompassing action entry for the entire pipeline, or it can be implemented as a set of unique TaskRuntimeMBeans for each action, with a Pipeline correlation identifier in each of the actions. In one embodiment, all activity corresponding to the Action tracking are represented in the UI for monitoring purposes as well as tracked in the Controller log file.

In some embodiments, for both long running actions and action pipelines, state persistence is required to provide the ability to deal with failure conditions of the Controller. A persisted context of pipeline execution needs to be maintained. A restarted Controller can report on the state of all pipelines and actions that were executing at the time of failure.

Pipeline

In accordance with an embodiment, the Pipeline is a form of complex Action where it consists of a list of Actions to be initiated. Configuration Component in a virtual environment provides the ability of configuring the Pipeline. The Pipeline Manager can construct the Pipeline instance for the PipelineBean that comes from the Configuration Component.

The Administrator can configure a Pipeline and associate it with multiple Actions. The Execution Engine defines an interface for the Pipeline and it expects any Pipeline being performed to implement this contract. A Pipeline can be configured for either parallel execution or for serial execution. In addition, the Pipeline maintains a Pipeline Context so that the Action(s) executed inside the Pipeline can make use of this Context object for getting to the state of execution or update the state of the execution.

While many virtual environment initiated tasks are simple actions (such as raising an alert), and can be implemented with a single JavaBean, other tasks require composing together multiple simple actions. For instance, an automated IT scenario requires starting a new application server instance, updating their web server plug-ins and logging a message; or a user chooses to log a message, raises an SNMP trap, and calls out to the application server to turn on additional debugging as one action. In one embodiment, a Pipeline processor can handle multi-step actions. The Pipeline processor is injected with the actions in its pipeline. The Pipeline runs through the simple actions calling out to each.

The Pipeline instance is configured to identify the ordered list of action beans to be executed. In one example, by default, the pipeline calls out to each bean sequentially. It is possible to allow for the metadata to configure a set of beans which may be run in parallel. In one embodiment, the parallel actions are run in separate threads and no guarantee is given about their execution ordering. In one embodiment, pipelines can mix sequential and parallel blocks, with all beans in a parallel block complete before moving on to the next sequential action.

In one embodiment, pipeline actions require context or the ability to pass state through the Pipeline. A java.util.Map can be passed to each action bean and is read or modified by the action. Parallel actions receive a thread-safe Map implementation. There is no need of passing any pipeline metadata to the action classes. In one example, the operation and control system for the virtual environment does not provide a means for them to know all the other beans in the pipeline or change the bean list.

For extensibility purposes, the operation and control system for the virtual environment can support third party action beans in the pipeline that do not implement any built-in interface. In this scenario, the configuration simply provides the method-name along with the class-name for action invocation.

In one embodiment, a pipeline action can signal an error by throwing an exception. When this occurs, the Pipeline bean guarantees no further sequential actions in the pipeline are called. Any parallel tasks running are allowed to complete. The pipeline optionally specifies an error handler in the metadata. This handler implements an Error Handler interface and is called first when error processing begins. The Error Handler is meant to handle any error processing that is global to the pipeline. For instance, it can email an administrator with the error. Actions in the pipeline may also request a callback. After calling the Error Handler (if one exists), the actions receive error callbacks in the reverse order as their execution callbacks. All error callbacks are sequential (single-threaded). The order of callbacks in a parallel block is undefined. Note that only beans which have already completed execution without error receive the callback. The bean's error callback is meant to undo anything it performed in its execution callback, if possible. Not all beans will implement this callback or be able to rollback.

A Pipeline can be executed in parallel or sequential. If the Pipeline is configured for parallel execution, it can initiate the execution on each Action associated with it in parallel. If it is configured for the sequential execution, then the Actions associated in it can be executed sequentially in the order in which they are configured. In one embodiment, the Pipeline maintains the status. Its status can be changed based on each transition.

In one embodiment, the Pipeline provides the accessor methods for adding, removing or getting the Actions, including getting the status of the Actions. In addition, the Pipeline provides API for initiating the adjudication, execution of the Actions, and preparing the associated Actions. Also, the Pipeline provides the accessor method for getting the PipelineContext so that it can be used by the Actions associated with the Pipeline. Last but not least, the Pipeline provides the types for lifecycle states of the Actions.

Figure 14:
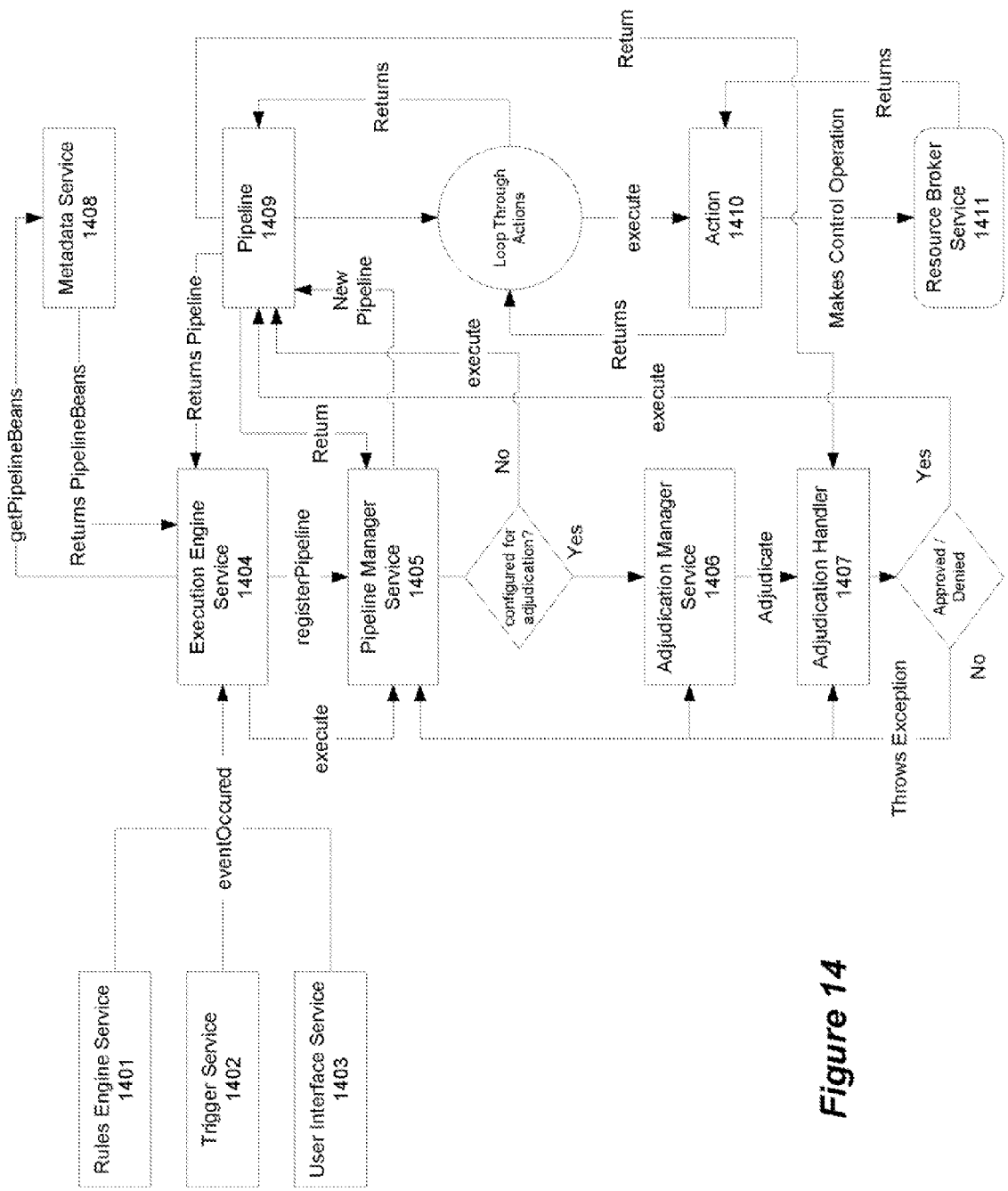
FIG. 14 is an illustration that shows basic flow diagram for the Pipeline or the Action execution, in accordance with an embodiment.

FIG. 14 shows a basic flow diagram for the Pipeline or the Action execution. As shown in FIG. 14, in one embodiment, the Execution Engine Service 1404 implements the contract Event Handler. When an Event fires as a result of a constraint failure in the Rules Engine 1401, or as a result of the Administrator selecting the Action(s) or Pipeline(s) for firing from User Interface Service 1403, the Execution Engine Service 1409 receives an Event fired message, eventOccured( ), and the corresponding EventMetric object. It can make use of the Application Metadata Service 1408 and finds the relevant Pipeline(s) 1409 or Action(s) 1410. After it finds the relevant Action(s) 1410 or Pipeline 1409 for the incoming Event, the Execution Engine Service 1404 registers the Event and the Action(s) or Pipeline with the Pipeline Manager Service 1405. After the successful registration of the Event and the Action(s) or the Pipeline with the Pipeline Manager Service 1405, it can initiate execute( ) for that Event. Then, the eventOccured( ) method can update the EventMetric's state when the Pipeline execution succeeds or fails.

In one embodiment, the Pipeline Manager 1405 is an internal OSGi service. It manages the registered Pipelines. It also provides the API for monitoring the registered Pipelines 1409. The Pipeline Manager 1405 also provides APIs for registering/deregistering the Pipelines 1409. If an Event results in one Action, the Pipeline Manager 1405 registers an internal Pipeline with one Action in it.

In one embodiment, the Pipeline Manager 1405 keeps the Pipeline instances even after their execution is completed so that they can be shown to the Administrator by the Administration Console. Such Pipelines can be kept around until they are marked as retired. The Pipeline Manager 1405 provides API for marking the Pipeline retired. After the Pipeline is marked retired, it is removed by the Pipeline Manager automatically when it purges the retired Pipelines.

In one embodiment, the Pipeline Manager 1405 provides APIs for registering/deregistering the Pipelines. In addition, the Pipeline Manager 1405 provides APIs for initiating the execution of a Pipeline identified with the interested Id. Also, the Pipeline Manager 1405 provides API for initiating the adjudication of a Pipeline identified with the interested Id. Also, the Pipeline Manager 1405 provides API for knowing lifecycle states such as is executing, is execution initiated, is prepared, is adjudication pending, is retired, is failed on a Pipeline identified with the interested Id. Also, the Pipeline Manager 1405 provides API for preparing a Pipeline identified with the given Id. Also, the Pipeline Manager 1405 provides the accessor method to get the active Pipelines so that the LOC Administration Console can use this and show the active Pipelines. Also, the Pipeline Manager 1405 provides the accessor method to get the retired Pipelines so that the LOC Administration Console can use this and show them to the Administrator. Also, the Pipeline Manager 1405 provides API for removing the retired Pipelines so that the LOC Administration Console can provide an option to the Administrator to explicitly remove them. Also, the Pipeline Manager 1405 provides API for retiring the finished Pipelines so that the LOC Administration Console can provide an option to the Administrator to explicitly mark them retired.

In one embodiment, every Pipeline has a Pipeline Context associated with it. This context provides the information of the state of the Pipeline and actions associated with the Pipeline. It also provides the context information such as for the Event the pipeline is initiated for execution and the affecting Service. All the Actions associated with the Pipeline have access to this Context object while they are being executed. The Context object is an intermediate object and can exist as long as the Pipeline exists.

In one embodiment, the Administrator is given an option to force the Pipeline removal and force marking a Pipeline retired. If the Pipeline is not marked for retire but it is completed the execution and is idle for the configured idle timeout, Pipeline Manager can automatically mark that Pipeline retired.

In one embodiment, the Pipeline Context provides API to get to the Pipeline instance for which this context belongs to. In addition, the Pipeline Context provides APIs to get the state of the Actions associated with the Pipeline to which this context belongs; the scoping information of the Pipeline being executed for which this context belongs to; the Event by which this Pipeline is initiated for execution; and, the time it took for state transitions.

In one embodiment, the Pipeline bean encapsulates a simple and lightweight java state machine. The expectation is that pipelines are relatively short-lived sets of tasks that do not require human intervention to complete. The pipeline does not persist its state or support long-running business processes. The pipeline does not include a decision or routing language between its steps.

For scenarios that do require this type of functionality the extensibility model could be leveraged to integrate with an external workflow engine. The third party action bean could make a web service or other remote call to the workflow engine and begin a business process or workflow.

Adjudication

In accordance with an embodiment, the Execution Engine provides the ability for a given single Action, or a defined Action Pipeline to be adjudicated. This allows for the approval or rejection of a given action that the Controller has initiated.

Adjudication is allowed on a given single action, or on the entire pipeline. In one embodiment, adjudication is not allowed for individual actions within the defined action pipeline. If the individual action, the pipeline, or an action within a pipeline is defined to require adjudication, then a single request for adjudication is made. Adjudication can also be configurable globally, on a per-action or on a per-service basis. In one embodiment, the architecture allows the registration of multiple adjudicators. When multiple adjudicators are configured, there is configuration available to define the approach for conflicting responses.

In one embodiment, a single adjudicator, for example the Console Adjudicator, results in the prompting of the Console administrator to approve or deny the execution. There can be a configurable timeout allowed for addressing the scenario where there is no response from the Administrator. In such a scenario the configuration also allows for defining whether or not a timeout should result in an approval or denial of the execution. In one example, a denial of a configured action execution leads to the Controller continuing to raise the same constraint violation. In this example, the Administrator can disable the Rule which caused the action request.

In one embodiment, the Adjudication Manager 1406 is an OSGi service defined by the Execution Engine that can register the Pipeline(s) or Action(s) for adjudication, configure the adjudication and provide monitoring points for the Pipeline(s) pending for adjudication. It also allows the Administrators to register adjudication handlers for plugging in their own adjudication methods. In one example, it registers one Adjudication Handler and this Handler waits for the Action(s) or the Pipeline(s) to move further for execution until the adjudication is done through the console where the Administrator of the system approves or denies the Action(s) or the Pipeline(s).

The Pipeline Manager 1405, as part of the prepare phase of the Pipeline, passes the Pipeline through the Adjudication Manager 1406 and registers the Pipeline for the adjudication with the Adjudication Manager 1406 if the Pipeline or the Action(s) associated with the Pipeline are configured for adjudication.

The Adjudication Manager 1406 provides API to perform adjudication for a given pipeline; to configure adjudication for a given application or service; to register/deregister AdjudicationHandler; and, to retrieve pending action-set for adjudication for auditing purposes.

The Adjudication Manager 1406 goes through the registered Adjudication Handlers 1407 and calls adjudication on them. The Adjudication Manager 1406 provides a way to register/deregister the Adjudication Handlers 1407. The Adjudication Manager 1406, while running through the Adjudication Handlers 1407, schedules the adjudication on a different thread so that it does not block the execution initiated thread.

The default Adjudication Handler 1407 is the type of adjudication that can be done through the Administration Console. While adjudicating through this Adjudication Handler 1407, it marks the Pipeline(s) or the Action(s) for adjudication and they are put on hold until the Administrator logs into the Administration Console, and, approves or denies the execution on these Pipeline(s) or Action(s).

The Pipeline Manager 1405 sends the Pipeline to the adjudication only when the Pipeline is explicitly configured for the adjudication but not for the individual Action(s). The Pipeline does not inherit the adjudication from the associated Actions. If the Pipeline is not configured for the adjudication but the associated Action(s) are configured for the adjudication a warning is issued and the Pipeline Manager can proceed as if it is non-adjudicated.

The Adjudication Handler 1407 blocks the thread when it executes the adjudication operation on the Pipeline or the Action. So, the Adjudication Manager 1406 uses one Work Manager for each Pipeline when it performs adjudication on the Pipelines. The Adjudication Manager 1406 schedules the adjudicate work with the Work Manager that corresponds to the Pipeline. In one embodiment, the Adjudication Manager 1406 can be used by the Pipeline Manager to initiate the adjudication.

In one embodiment, the Administrator can configure the action-sets or pipelines for the purpose of adjudication. Configuration can be based on Global level adjudication. Thus, all the Actions, if they are individually configured, and all the Pipelines are adjudicated by the Adjudication Manager. The Administrator can optionally provide an exclude list of the Pipelines or the Actions.

Configuration can also be based on Service level adjudication. The Administrator can define the Service level adjudications. In this case, all the Actions of the specified Service if they are individually configured and all the Pipelines of the specified Service is adjudicated by the Adjudication Manager. The Administrator can optionally provide an exclude list of the Pipelines or the Actions for the adjudication.

Configuration can also be based on ProcessType level adjudication. The Administrator can define the ProcessType level adjudications. In this case, all the Actions of the specified ProcessType, if they are individually configured, and all the Pipelines of the specified ProcessType are adjudicated by the Adjudication Manager. The Administrator can optionally provide an exclude list of the Pipelines or the Actions for the adjudication.

Configuration can also be based on Instance level adjudication. The Administrator can define the instance level adjudications. In this case, all the Actions of the specified instance, if they are individually configured, and all the Pipelines of the specified instance are adjudicated by the Adjudication Manager.

Configuration can also be based on Pipeline level adjudication. The Administrator can define a particular Pipeline for adjudication. The configuration can be explicitly called out for this. The Pipeline does not inherit the adjudication configuration from the associated Actions.

Configuration can also be based on Action level adjudication. The Administrator can define a particular Action for adjudication. The adjudication configuration on the Action has no effect if the Action is associated in a Pipeline. A warning is issued if it is part of a Pipeline and the Pipeline can be executed with or without adjudication depending on the Pipeline configuration.

Some of the above mentioned scopes (Global, Service and ProcessType) have the option of providing an exclude list. When an exclude list is specified, the Adjudication Manager honors the exclude list and filters the Pipelines or the Actions in the exclude list. If the Action in the exclude list is part of a Pipeline, then a warning can be issued and it may not be excluded individually.

In one embodiment, the adjudication decisions can be made pluggable and extensible. The Adjudication Manager 1406 can provide an Adjudication Handler contract so that the Administrator can programmatically register/deregister the Adjudication Handler(s). The Adjudication Handler allows the Administrator to plug-in third-party methods of adjudications. The Adjudication Handler 1407 can provide an API for adjudicating the given Pipeline and another API for adjudicating the given Action.

Interaction Between the Rules Engine and Execution Engine

In accordance with an embodiment, service and constraint information can be provided to the RulesEngineService when the Controller is booted. It is also possible to dynamically update this information via the same interface. Once initialized, the RulesEngineService takes input primarily from the Monitor and provides input to the ExecuteEngine Service.

In one embodiment, the constraints are applied to a piece of observed data that is of a particular type (int, string, date, etc.). In addition to Constraint definitions, the RulesEngineService has APIs to create and deploy services. The deployment state affects whether Constraints are applied for a particular service. One can have separate constraints for the deployed state and the un-deployed state. An example of a constraint for the un-deployed state is one that defines the number of processes allowed to be zero.

Figure 15:
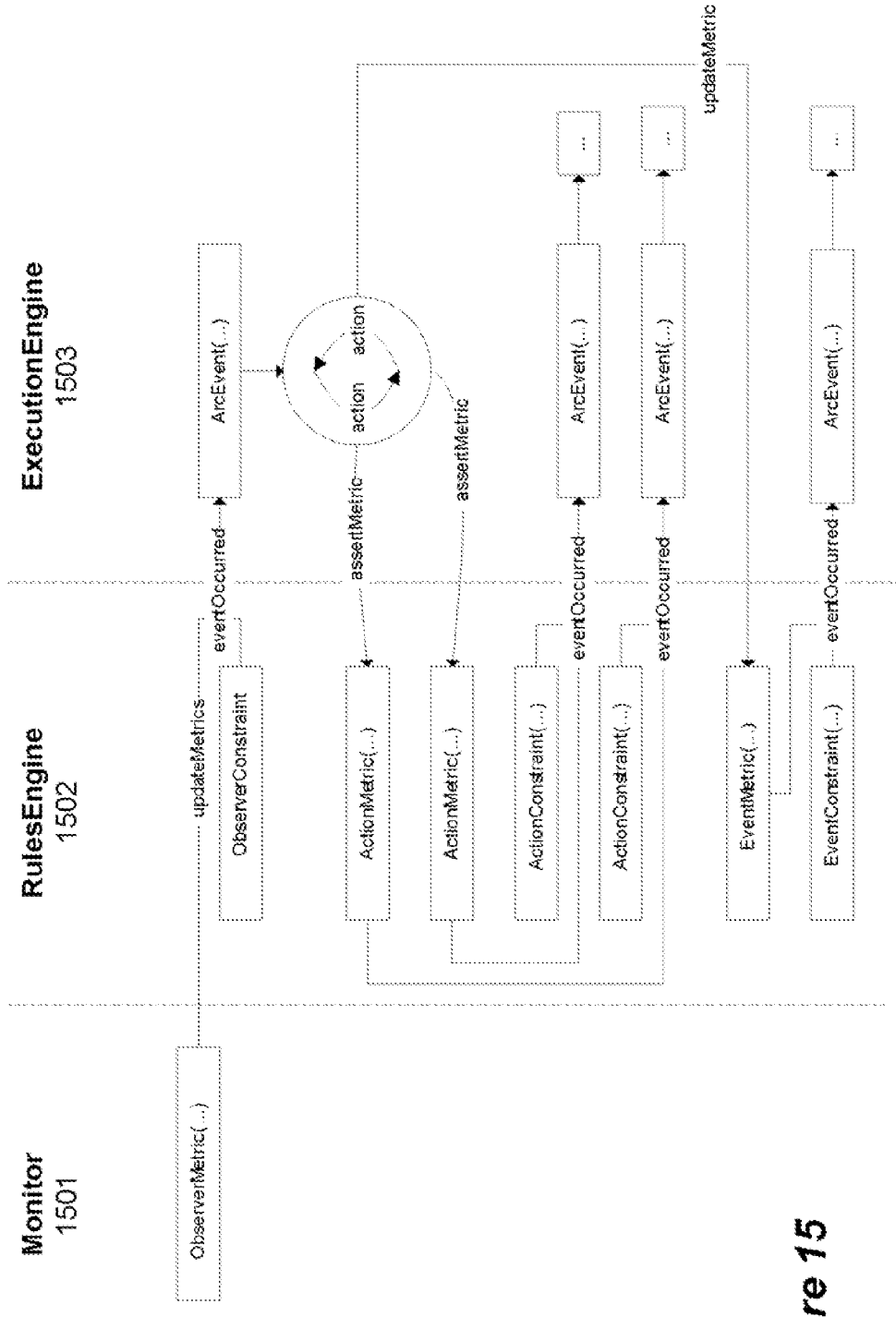
FIG. 15 is an illustration that shows the basic feedback loop that occurs between the Rules Engine, the Monitor and the Execute Engine, in accordance with an embodiment.

FIG. 15 shows the basic feedback loop that occurs between the Rules Engine, the Monitor and the Execute Engine.

In one embodiment, the Execute Engine 1503 implements the interface ArcEventHandler, the API that the Rules Engine 1502 calls to pass an ArcEvent to the Execute Engine 1503.

When the Rules Engine 1502 sends an event to the Execute Engine 1503, the event carries with it information necessary for handling the event. This information varies depending on the scope of the constraint failure that caused the event. For example, a process level event carries the service name and process type; whereas a service level issue carries wider information about the service state.

The function of the RulesEngineService is closely dependent on the Monitor 1501 and Execute Engine 1503. The monitor 1501 pushes ObserverMetrics to the Rules Engine 1502. These metrics are matched with ObserverConstraints. If the metric does not satisfy the constraint, an ArcEvent is passed to the Execute Engine 1503. The Rules Engine 1502 can also assert an EventMetric to its working memory indicating that the event was passed to the Execute Engine 1503 for handling. This EventMetric is provided to the Execute Engine 1503 along with the ArcEvent.

The Execute Engine 1503 can perform one or more actions when it receives the event. When the Execute Engine 1503 starts an action, it asserts an ActionMetric to the Rules Engine 1502. The state of the ActionMetric can be modified by the Execute Engine 1503 as the action progresses and can finally be marked as successful or failed. This information may be used in later rules processing.

After the Execute Engine 1503 is finished performing the actions associated with an event, it updates the EventMetric previously asserted by the Rules Engine 1502 to indicate the success or failure of the event as a whole which again may be used in later rules processing.

Depending on the constraints, this cycle can continue on allowing users to set up multi-step responses to the initial constraint failure as well as alternate actions when the initial action fails.

In one embodiment, any subsequent events that occur from matching of ActionMetrics and EventMetrics are not sent until the Execute Engine 1503 returns from the eventOccurred call as the Rules Engine 1502 serializes calls to eventOccurred.

There are different kinds of ArcEvents which may be passed to the Execute Engine 1503 depending on the nature of the rule that generates the event. These different event types carry different information in them depending on the scope of the event. In one embodiment, the Rules Engine 1502 does not know what actions are carried out as a result of an event. It only finds out about actions that the Execute Engine 1403 performs via ActionMetrics.

Trigger Service

In accordance with an embodiment, the Trigger Service is a service that provides for time based events. The Trigger Service is intended to satisfy the requirement for Time Based Constraints. In one example, this service is built on top of the Open Source job scheduling system known as Quartz. Quartz has a flexible interface that lets you declare trigger points in a number of ways. In one case, the Trigger Service can only expose a small subset of the Quartz declarative capabilities.

When a trigger is fired, an action (or job) can be performed. In one embodiment, an action or job includes deploying a service, which is to call RulesEngineService.deployService that lead to a DeploymentEvent being passed to the Execute Engine. In addition, an action or job includes undeploying a service, which is to call RulesEngineService.undeployService that also leads to a DeploymentEvent being passed to the Execute Engine. Also, an action or job includes sending an Event to the Execute Engine allowing one to execute an ArcAction or a Pipeline.

In one embodiment, the TriggerService is configured with Trigger Beans. The Trigger Bean defines a name for the trigger and a Job class to run when the trigger is pulled. Sub-classes of Trigger Beans define the time information that controls when the trigger goes off. In one example, trigger points can be defined using CronTriggerBean with a cron string. Other ways can also be used for defining trigger points.

Figure 16:
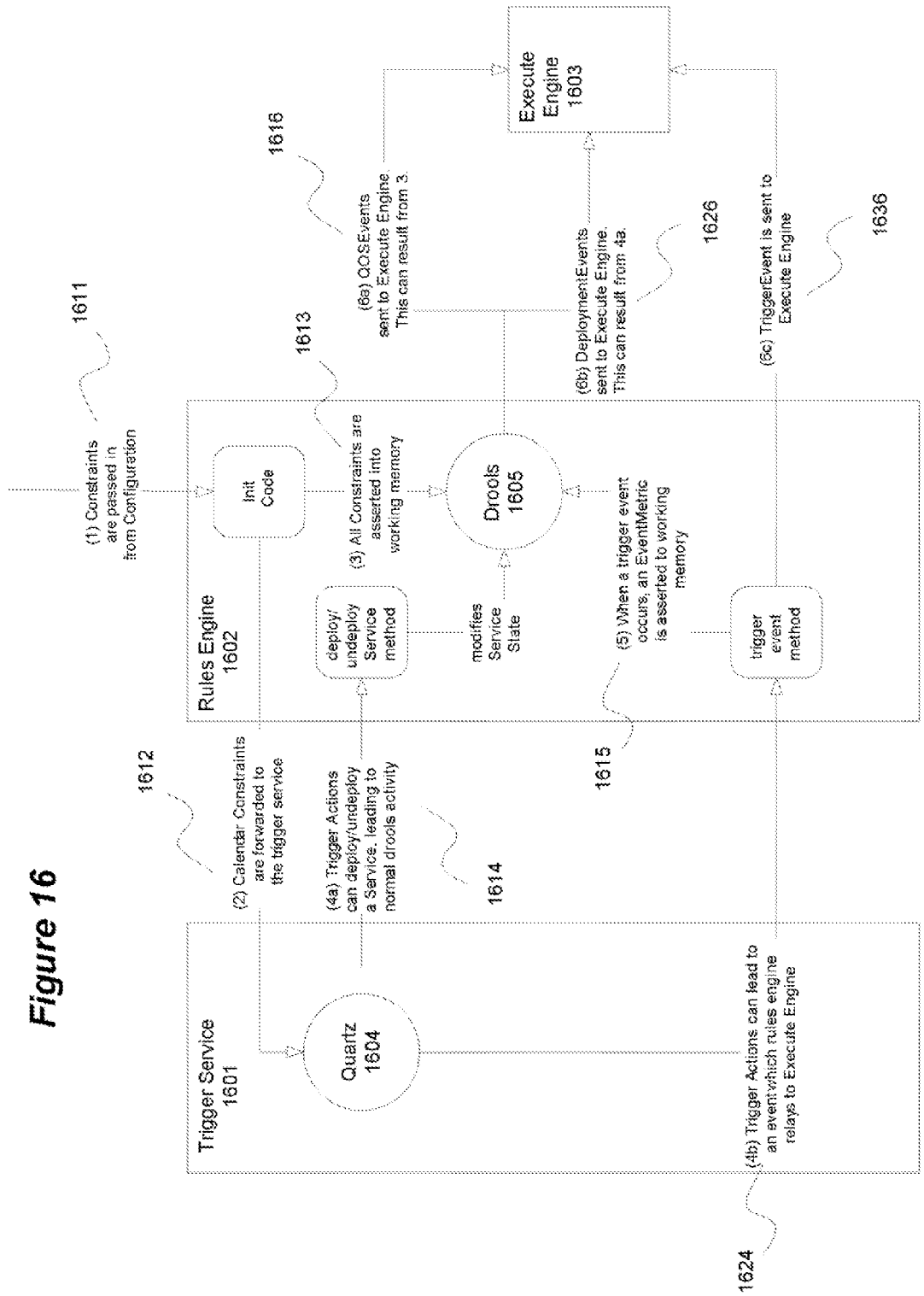
FIG. 16 is an illustration that shows how the trigger service interacts with the rules engine, in accordance with an embodiment.

FIG. 16 shows how the trigger service interacts with the rules engine. For any calendar constraints, the trigger service registers a trigger. As shown in FIG. 16, one embodiment includes a trigger service 1601 that listens for constraints that are passed to the rules engine 1602. The trigger service 1601 is associated with a job scheduling system such as a Quartz system, while the rules engine 1602 is associated with a Drools Rules Engine 1605.

At step (1) 1611, constraints are passed in to the Rules Engine 1602 from configuration.

At Step (2) 1612, the Rules Engine 1602 can forward calendar constraints to the trigger service 1612.

At Step (3) 1613, the Rules Engine 1602 can assert all constraints into working memory of Drools Rules Engine 1605.

At Step (4*a*) 1614, the Quartz job scheduling system 1604 can deploy/undeploy a service, leading to normal Drools activity.

At Step (4*b*) 1624, the Quartz job scheduling system 1604 can lead to a event which the Rules Engine 1602 relays to the Execution Engine 1603.

At Step (5*a*) 1615, the Rules Engine 1602 can modify the service state.

At Step (5*b*) 1625, the Rules Engine 1602 can assert an EventMetric to working memory of Drools Rules Engine 1605, when a trigger event occurs.

At Step (6*a*) 1616, as a result of step (3) 1613, a QoSEvent can be sent to the Execution Engine 1603.

At Step (6*b*) 1626, as a result of step (4*a*) 1614, a DeploymentEvent can be sent to the Execution Engine 1503.

At Step (6*c*) 1636, as a result of step (4*b*) 1624, a triggerEvent can be sent to the Execution Engine 1603.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a JRockit environment, other application servers, virtual machines, JVMs, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for deploying and managing software services, comprising:
    a computing environment that includes a plurality of machines, which are organized into resource pools, wherein each of the resource pools includes a collection of virtualized resources;
    a plurality of software services, wherein each of the plurality of software services includes one or more software applications which are manageable as a unit and deployable to one of the resource pools;
    a plurality of agents, wherein each of the plurality of agents resides on one of the plurality of the machines, manages the software applications and resources on the one of the plurality of machines, and exposes the resources to the resource pools for use by the computing environment;
    a system controller that communicates with the plurality of agents to determine resources available on the machines and to select a resource pool for deploying a software service, based on one or more of remaining capacity of the resource pool, dependencies of the software service, a service level agreement (SLA) of software services already deployed on the resource pool, and a priority for the software service; and
    a rules engine that compares administrator defined constraints with runtime metrics, and generates events when a said constraint is violated by a said runtime metric.

2. The system according to claim 1, wherein the plurality of machines include virtualized machines, or non-virtualized machines, or a combination thereof.

3. The system according to claim 1, wherein a said administrator defined constraint is a user defined SLA.

4. The system according to claim 1, wherein the runtime metrics are provided to the rules engine by a monitor service.

5. The system according to claim 1, wherein each of the events generated by the rules engine carries with it information necessary to handle the event.

6. The system according to claim 5, wherein the information necessary to handle the event including a scope of a constraint failure that caused the event.

7. A method for deploying and managing software services, comprising the steps of:
    providing a computing environment that includes a plurality of machines, which are organized into resource pools, wherein each of the resource pools includes a collection of virtualized resources;
    providing a plurality of software services, wherein each of the plurality of software services includes one or more software applications which are manageable as a unit and deployable to one of the resource pools;
    providing an agent on each of the plurality of machines, wherein the agent manages the software applications and resources on the each machine, and exposes the resources of the each machine to the resource pools for use by the computing environment;

providing a system controller that communicates with the plurality of agents to determine the resources available on the machines and to select a resource pool for deploying a software service, based on one or more of remaining capacity of the resource pool, dependencies of the software service, a service level agreement (SLA) of software services already deployed on the resource pool, and a priority for the software service; and providing a rules engine that compares administrator defined constraints with runtime metrics, and generates events when a said constraint is violated by a said metric.

8. The method according to claim 7, wherein the plurality of machines include virtualized machines, or non-virtualized machines, or a combination thereof.

9. The method according to claim 7, wherein a said administrator defined constraint is a user defined SLA.

10. The method according to claim 7, wherein the runtime metrics are provided to the rules engine by a monitor service.

11. The method according to claim 7, wherein each of the events generated by the rules engine carries with it information necessary to handle the event.

12. The method according to claim 11, wherein the information necessary to handle the event including a scope of a constraint failure that caused the event.

13. A non-transitory machine readable storage medium having instructions stored thereon that when executed cause a system to perform the steps comprising:

providing a computing environment that includes a plurality of machines, which are organized into resource pools, wherein each of the resource pools includes a collection of virtualized resources;

providing a plurality of software services, wherein each of the plurality of software services includes one or more software applications which are manageable as a unit and deployable to one of the resource pools;

providing an agent on each of the plurality of machines, wherein the agent manages the software applications and resources on the each machine, and exposes the resources of the each machine to the resource pools for use by the computing environment;

providing a system controller that communicates with the plurality of agents to determine the resources available on the machines and to select a resource pool for deploying a software service, based on one or more of remaining capacity of the resource pool, dependencies of the software service, a service level agreement (SLA) of software services already deployed on the resource pool, and a priority for the software service; and providing a rules engine that compares administrator defined constraints with runtime metrics, and generates events when a said constraint is violated by a said metric.

14. The non-transitory machine readable storage medium to claim 13, wherein the plurality of machines include virtualized machines, or non-virtualized machines, or a combination thereof.

15. The non-transitory machine readable storage medium to claim 13, wherein a said administrator defined constraint is a user defined SLA.

16. The non-transitory machine readable storage medium to claim 13, wherein the runtime metrics are provided to the rules engine by a monitor service.

17. The non-transitory machine readable storage medium to claim 13, wherein each of the events generated by the rules engine carries with it information necessary to handle the event.

18. The non-transitory machine readable storage medium to claim 17, wherein the information necessary to handle the event including a scope of a constraint failure that caused the event.

* * * * *

UNITED STATES PATENT AND TRADEMARK OFFICE
CERTIFICATE OF CORRECTION

PATENT NO. : 8,832,710 B2  Page 1 of 1
APPLICATION NO. : 14/102137
DATED : September 9, 2014
INVENTOR(S) : Mousseau et al.

It is certified that error appears in the above-identified patent and that said Letters Patent is hereby corrected as shown below:

In The Specification

In column 3, line 60, delete "running" and insert -- running. --, therefor.

In column 25, lines 8-9, delete "adjudication.The" and insert -- adjudication. The --, therefor.

In The Claims

In column 30, line 19, in Claim 14, delete "to" and insert -- according to --, therefor.

In column 30, line 23, in Claim 15, delete "to" and insert -- according to --, therefor.

In column 30, line 26, in Claim 16, delete "to claim" and insert -- according to claim --, therefor.

In column 30, line 29, in Claim 17, delete "to" and insert -- according to --, therefor.

In column 30, line 34, in Claim 18, delete "to claim" and insert -- according to claim --, therefor.

Signed and Sealed this
Seventeenth Day of March, 2015

Michelle K. Lee
*Director of the United States Patent and Trademark Office*